United States Patent [19]

Mori et al.

[11] 4,113,667

[45] Sep. 12, 1978

[54] FLAME RESISTANT POLYURETHANE FOAM AND PROCESS FOR PRODUCING THE SAME

[75] Inventors: Shigeo Mori; Takeshi Fujita, both of Kyoto, Japan

[73] Assignee: Dai-Ichi Kogyo Seiyaku Co., Ltd., Kyoto, Japan

[21] Appl. No.: 616,722

[22] Filed: Sep. 25, 1975

Related U.S. Application Data

[63] Continuation of Ser. No. 440,622, Feb. 7, 1974, abandoned.

[30] Foreign Application Priority Data

| Feb. 8, 1973 | [JP] | Japan | 48-15863 |
| Mar. 15, 1973 | [JP] | Japan | 48-30704 |
| Mar. 24, 1973 | [JP] | Japan | 48-33699 |
| Mar. 26, 1973 | [JP] | Japan | 48-34883 |
| Mar. 31, 1973 | [JP] | Japan | 48-37114 |
| Apr. 1, 1973 | [JP] | Japan | 48-38050 |

[51] Int. Cl.$^2$ .................. C08G 18/32; C08G 18/38
[52] U.S. Cl. .................. 521/163; 521/166; 521/167
[58] Field of Search .................. 260/2.5 AC, 2.5 AM, 260/2.5 AJ, 2.5 AQ

[56] References Cited

U.S. PATENT DOCUMENTS

| 3,001,955 | 9/1961 | Taub | 260/2.5 AC |
| 3,019,200 | 1/1962 | Gee | 260/2.5 AC |
| 3,042,631 | 7/1962 | Strandskov | 260/2.5 AQ |
| 3,073,787 | 1/1963 | Krakler | 260/2.5 AC |
| 3,124,543 | 3/1964 | Fowler | 260/2.5 AB |
| 3,234,153 | 2/1966 | Britain | 260/2.5 AC |
| 3,243,389 | 3/1966 | Moller | 260/2.5 AC |
| 3,528,933 | 9/1970 | Johnson | 260/2.5 AM |
| 3,599,814 | 7/1971 | Lloyd | 260/2.5 AM |
| 3,637,540 | 1/1972 | Wolff | 260/2.5 AM |
| 3,644,228 | 2/1972 | Diehr | 260/2.5 AJ |
| 3,699,078 | 10/1972 | Castro | 260/2.5 AM |
| 3,717,597 | 2/1973 | Hesskamp | 260/2.5 AJ |
| 3,726,952 | 4/1973 | Boden | 260/2.5 AC |
| 3,801,678 | 4/1974 | Nachbur | 260/2.5 AJ |
| 3,803,063 | 4/1974 | Krentz | 260/2.5 AJ |
| 4,007,140 | 2/1977 | Ibbotson | 260/2.5 AC |
| 4,008,185 | 2/1977 | Olstowski | 260/2.5 AC |
| 4,042,537 | 8/1977 | Dahm | 260/2.5 AM |

FOREIGN PATENT DOCUMENTS 1,054,663   1/1967   United Kingdom ............. 260/2.5 AQ

*Primary Examiner*—C. Warren Ivy
*Attorney, Agent, or Firm*—Sughrue, Rothwell, Mion, Zinn and Macpeak

[57] ABSTRACT

A process for producing a flame resistant polyurethane foam by reacting a reaction mixture comprising a polyetherpolyol or a polyesterpolyol having an active hydrogen atom, a polyisocyanate, water and/or a volatile foaming agent, and a catalyst, in which a specific amine compound shown by the general formula as defined hereinafter in the specification is added to the reaction system, and also the flame resistant polyurethane foam produced by the process.

25 Claims, No Drawings

FLAME RESISTANT POLYURETHANE FOAM AND PROCESS FOR PRODUCING THE SAME

This is a continuation of application Ser. No. 440,622, filed Feb. 7, 1974, now abandoned.

BACKGROUND OF THE INVENTION

1. Field of the Invention

The present invention relates to a process of producing a polyurethane foam having flame resistance and more particularly, it relates to a process for producing a polyurethane foam having a high flame resistance and unaccompanied with a reduction in the properties of the polyurethane foam and with the formation of scorching. The invention further relates to the flame resistant polyurethane produced by such a process. In addition, the term "polyurethane foam" as used herein is intended to designate a "soft polyurethane foam."

2. Description of the Prior Art

Polyurethane foams have hitherto been used in a large number of fields due to their specific properties but have a serious disadvantage in that polyurethane foams are easily flamable.

Recently, however, regulations on the extent for rendering polyurethane materials flame retardant or flame resistant tend to become severer and severer, and the tendency is particularly remarkable in the application thereof in the fields of automobiles, railway vehicles, aircraft, etc.

The rendering of flame retarding properties or flame resistance to polyurethane foams is an important problem as described above but it has not yet been solved by conventional techniques. The methods which have been industrially employed at present still have a large number of difficulties.

Some techniques for rendering polyurethane foams flame retardant are described in the specifications of, e.g., Japanese Patent Publication Nos. 1750/'63, 9197/'70, 349/'64, 4846/'64, 8696/'64, 26335/'71, 21358/'69, 13037/'66, 2269/'71, etc., but these techniques are insufficient for satisfying the necessary requirements.

For example, Japanese Patent Publication Nos. 1750/'63, 9197/'70, etc. disclose the use of phosphorus-containing compounds or halogen-containing compounds as flame retarders for polyurethane foams but, in such known techniques, the phosphorus-containing compound must be added to such an extent that the content of phosphorus in the foam is higher than 1% or the flame retarder must be blended so that the content thereof is 5 to 30% by weight of the polyurethane foam. As a result of using such a large amount of flame retarder, the properties of the polyurethane foam are degraded, for example, the hardness is reduced, permanent set is increased, the strength is reduced, etc. Furthermore, when the polyurethane material is foamed excessively, the so-called scorching phenomenon occurs lowering the commercial value of the article. Moreover, since in such case the concentration of the flame retarder is high, the flame retarder tends to volatilize away due to the action of heat or with the passage of time, which results in a reduction in the flame proofing or flame resisting effects.

Also, in the polyurethane foam industry, various efforts have been to reduce the cost of polyurethane foams by increasing the effective utilization of the foams. For example, in case of making a cubic article of polyurethane foam from a crude foam with a curved surface layer, an attempt to increase the effective utilization of the crude foam is made by increasing the amount of the foam molded in one operation to reduce the amount of dust formed on cutting the article to as small as possible.

However, when a large amount of a phosphorus-containing compound or a halogen-containing compound is added to a foaming mixture as a flame retarder and the mixture is foamed into a large foam material, scorching occurs and in order to prevent the formation of such scorching, the content of the flame retarder must be reduced to as small as possible. Therefore, the developmment of a foaming technique which can render polyurethane foams flame retardant using as little an amount of a flame retarder as is possible or without using any flame retarder has been highly desired.

As described above, an important problem has been to improve the flame resistance of the polyurethane foam by blending a halogen-containing or phosphorus-containing compound in an amount as small as possible.

The extent of the reduction of the amount of retarder depends upon the extent of flame resistance required in the polyurethane foam and the properties of the flame retarder used but it is preferred that the amount be as small as possible and further it is most preferred that a flame retarder not be used at all.

SUMMARY OF THE INVENTION

With such in mind, the inventors have investigated and as the result of their investigations have discovered that a polyurethane foam having excellent flame resistance with less reduction in the desired properties thereof can be produced using a greatly reduced amount of a flame retarder or without using any flame retarder by blending the raw materials for producing the polyurethane with a specific amine compound.

Thus, according to the present invention, a process of producing a flame resistant polyurethane foam is provided which comprises reacting a mixture of a polyetherpolyol or a polyesterpolyol having an active hydrogen atom, a polyisocyanate, water and/or a volatile foaming agent, and a catalyst, and containing in the reaction system at least one amine compound represented by any one of the following general formulae (I), (II), (III), (IV), (V), (VI) and (VII):

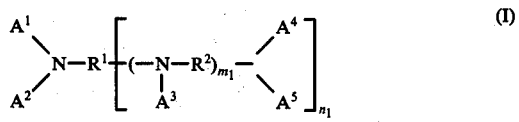

wherein $A^1$, $A^2$, $A^3$, $A^4$, and $A^5$ each represents a hydrogen atom or a monovalent organic group, wherein only one of $A^1$ to $A^5$ may optionally be a group containing a hydroxyl group, at least one of $A^1$ to $A^5$ being a hydrogen atom, and at least one of $A^1$ to $A^5$ being a group which does not contain a hydrogen atom active to an isocyanate group; $R^1$ is a divalent organic group, a trivalent organic group or a tetravalent organic group; $R^2$ represents a divalent organic group; $m_1$ represents 0 or a positive integer smaller than 8; and $n_1$ represents 1, 2 or 3;

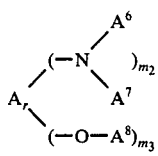

(II)

wherein $A_r$ represents a divalent or trivalent aromatic or alicyclic group which may be substituted or unsubstituted; $A^6$, $A^7$, and $A^8$ each represents a hydrogen atom or a monovalent organic group, with at least one of $A^6$ to $A^8$ being a hydrogen atom or an organic group which contains a hydrogen atom active to an isocyanate group; $m_2$ represents an integer of 1 to 3; and $m_3$ represents 0 or 1, the sum of $m_2$ and $m_3$ being 2, or 3;

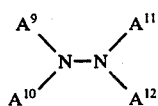

(III)

wherein $A^9$, $A^{10}$, $A^{11}$, and $A^{12}$ each represents a hydrogen atom or a monovalent organic group, with at least one of $A^9$ to $A^{12}$ being a hydrogen atom or an organic group which contains a hydrogen atom active to an isocyanate group;

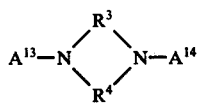

(IV)

wherein $A^{13}$ and $A^{14}$ each represents a hydrogen atom or a monovalent organic group, with at least one of $A^{13}$ and $A^{14}$ being a hydrogen atom or an organic group which contains a hydrogen atom active to an isocyanate group and $R^3$ and $R^4$ each represents a divalent organic group;

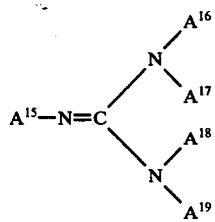

(V)

wherein $A^{15}$, $A^{16}$, $A^{17}$, and $A^{19}$ each represents a hydrogen atom or a monovalent organic group, with at least one of $A^{15}$ to $A^{19}$ being a hydrogen atom or an organic group which contains a hydrogen atom active to an isocyanate group;

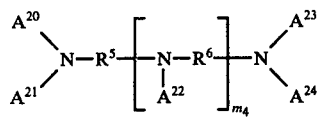

(VI)

wherein $A^{20}$, $A^{21}$, $A^{22}$, $A^{23}$, and $A^{24}$ each represents a hydrogen atom or a monovalent organic group, with at least two of $A^{20}$ to $A^{24}$ containing a hydroxy group substituent; $R^5$ and $R^6$ each represents a divalent organic group; and $m_4$ represents 0 or a positive integer smaller than 8; and

(VII)

wherein $R^7$ represents a hydrogen atom, a monovalent organic group, a divalent organic group, or a trivalent organic group; $A^{25}$ and $A^{26}$ each represents a hydrogen atom or a monovalent organic group, with at least one of $R^7$, $A^{25}$, and $A^{26}$ being a hydrogen atom or an organic group which contains a hydrogen atom active to an isocyanate group; Z represents an oxygen atom or a sulfur atom; and $n_2$ represents an integer of 1 to 3.

Furthermore, according to this invention, a flame resistant polyurethane foam produced by the aforesaid process is provided. By the process of this invention, it becomes possible to produce a polyurethane foam having high flame resisting properties unaccompanied by the occurrence of scorching in decreasing the amount of flame retarder to such an extent that has been considered to be impossible to provide flame resisting properties using conventional techniques.

DETAILED DESCRIPTION OF THE INVENTION

A feature common to the amine compounds represented by aforesaid general formulae (I) – (VII) is that they contain a hydrogen atom active to an isocyanate group. A feature of the present invention lies in the point that by adding the aforesaid amine compound to the reaction system used in the production of polyurethane foam, the amine compound is introduced in the molecular structure of the polyurethane foam and in this case by properly controlling the reaction of the active hydrogen atom in the amine compound with the isocyanate group, the polymer chain of the foam has excellent flame resisting properties. The control of the reaction of such an active hydrogen atom and an isocyanate group in this invention can be attained by permitting nitrogen atoms to exist in the same molecule containing the active hydrogen atom. That is, while not desiring to be bound by theory it is believed that the lone electron pair (the electron pair which does not contribute to the covalent bond) of the nitrogen atom present in the same molecule controls the reaction in the preferable direction. For example, when only one nitrogen atom is present in the molecule, the flame resistance is only barely improved but when more than two nitrogen atoms are present in the molecule, a co-action results to improve the flame resistance. One explanation, perhaps, is that where two or more nitrogen atoms are present in the same molecule the electronegativity of each is reduced and the catalytic effect of the nitrogen atoms having the thus reduced electronegativity influences the structure of the urethane polymer formed.

However, it is necessary that the amine compound in this invention have at least one nitrogen atom in spite of the above-stated considerations and when the amine compound has only one nitrogen atom, another polar atom can be employed in the manner of the second nitrogen atom. That is, such is illustrated by the amine compound of the general formula (VII) in which a polar oxygen atom or sulfur atom exists in the form of a resonance structure with the nitrogen atom. Furthermore when two nitrogen atoms are connected directly to the aromatic nucleus as the amine compound shown by general formula (II) to provide a resonance structure, their electronegativities of the nitrogen atoms are greatly reduced.

It is essential that the amine compound shown by the general formula (I) has at least one hydrogen atom directly connected to the nitrogen atom. Therefore, as indicated above, when $m_1$ is 0 in the amine compound of the general formula (I), it is necessary that at least one of $A^1$, $A^2$, $A^4$, and $A^5$ be a hydrogen atom. However, since if all of $A^1$, $A^2$, $A^4$, and $A^5$ are a hydrogen atom, the reaction with the isocyanate group proceeds too quickly, which results in a loss of freedom in controlling the polymer chain of the urethane foam and making it difficult to arrange the chain so as to possess flame resistance, at least one of $A^1$ to $A^5$ must be a group which is inactive to the isocyanate group. Examples of monovalent groups represented by $A^1$ to $A^5$ include saturated or unsaturated alkyl groups, aryl groups, alicyclic groups and substituted alkyl, aryl and alicyclic groups. In this case, the number of carbon atoms of the alkyl group can range from 1 to 22 and the number of carbon atoms forming the ring of the alicyclic group can range from about 3 to 6. Examples of suitable substituents are an amino group, a hydroxyl group, a cyano group, a halogen atom, a mercapto group and the like.

Furthermore, specific examples of the organic groups represented by $A^1$ to $A^5$ are organic groups including

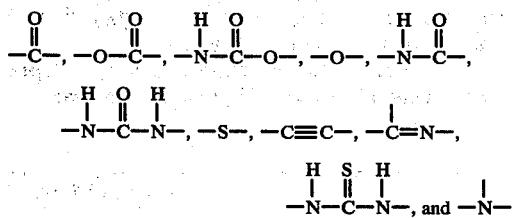

groupings in their structure. Suitable such groups are, for example,

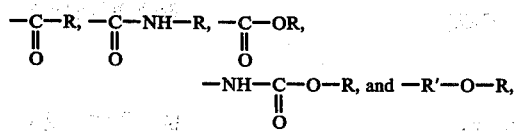

wherein R represents a saturated or unsaturated lower alkyl group or an aryl group and R' represents a saturated or unsaturated lower alkylene group having, preferably, 1 to 22 carbon atoms.

Suitable examples of the organic groups of $A^1$ to $A^5$ are

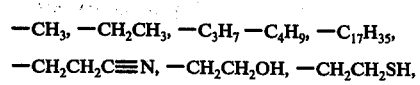

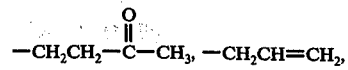

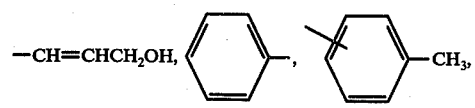

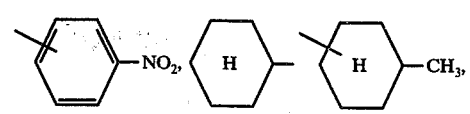

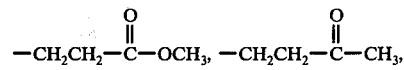

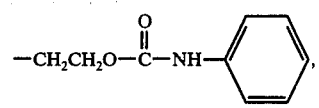

and the like.

Examples of the divalent organic group represented by $R^1$ and $R^2$ in the general formula (I) are a saturated or unsaturated alkylene group, an arylene group, a divalent alicyclic group, and substituted groups of these groups, the alkylene group having about 1 to 22 carbon atoms and the number of carbon atoms forming the ring of the alicyclic group being about 3 to 6. Specific examples of suitable divalent organic groups are as follows:

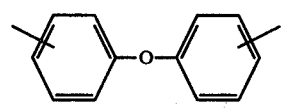

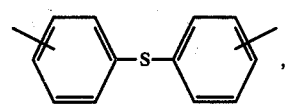

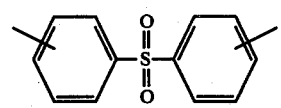

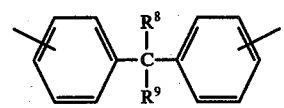

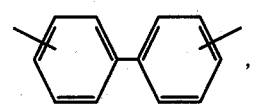

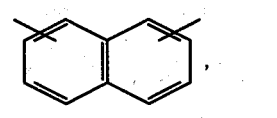

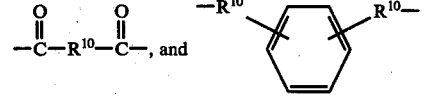

wherein $R^8$ and $R^9$ each represents a hydrogen atom or a lower alkyl group having, preferably, 1 to 8 carbon atoms, and $R^{10}$ represents an alkylene group having, preferably, 1 to 22 carbon atoms. The above illustrated groups may also be partially or fully hydrogenated. Suitable examples of $R^8$ and $R^9$ are a hydrogen atom and a methyl group, and suitable examples of $R^{10}$ are —$CH_2$— or —$C_4H_8$—. Furthermore, specific examples of the divalent organic groups are organic groups having at least one of

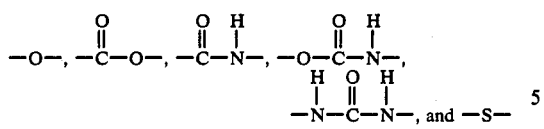

in the groups. For example, there are

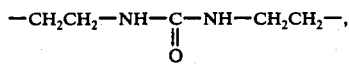

—CH₂CH₂—S—CH₂CH₂—,

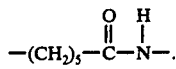

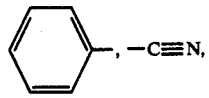

Also, examples of substituents of these divalent organic groups are

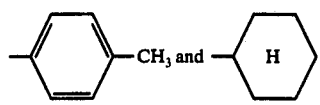

Also, specific examples of the trivalent organic groups and tetravalent organic groups represented by $R^1$ are as follows:

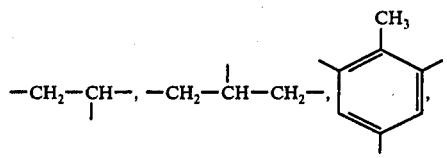

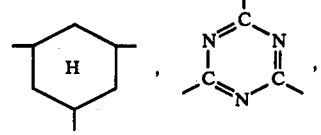

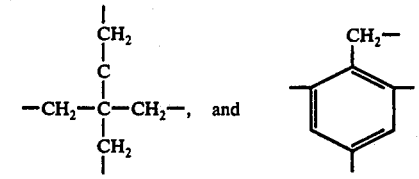

Examples of the trivalent and tetravalent organic groups represented by $R^1$ in general formula (I) are a saturated or unsaturated aliphatic hydrocarbon group, an aromatic hydrocarbon group, an alicyclic hydrocarbon group and a heterocyclic group.

Typical examples of amine compounds represented by the general formula (I) are shown below:

| | (Compound Designation) |
|---|---|
| 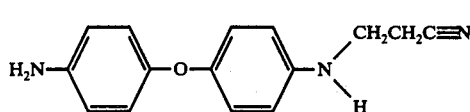 | Light-yellow Solid |
| 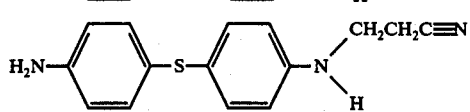 | Black-Brown Solid |
| 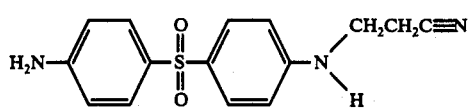 | Black-Brown Solid |
| 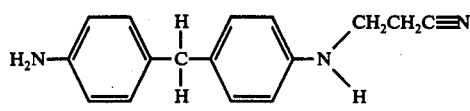 | Light-Yellow Solid |
| 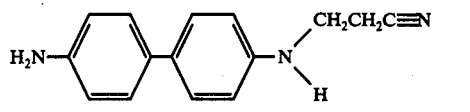 | Light-Yellow Solid |
| 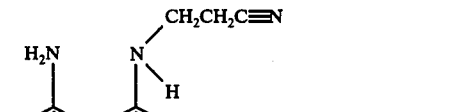 | Light-Yellow Solid |
| 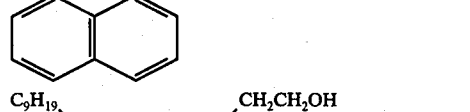 | |
| 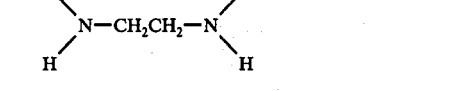 | Yellow Liquid (X-1) |

-continued

| Structure | (Compound Designation) |
|---|---|
| $C_{17}H_{35}-C=O$ <br> $\quad\quad\quad$ N—CH$_2$CH$_2$—N—CH$_2$CH$_2$—N—CH$_2$CH$_2$OH <br> $\quad\quad\quad$ H $\quad\quad\quad$ H $\quad\quad\quad$ H | Yellow Solid (X-2) |
| $C_4H_9$—OCH$_2$CH$_2$CH$_2$ $\quad\quad\quad$ CH$_2$CH$_2$C≡N <br> $\quad\quad\quad$ N—CH$_2$CH$_2$—N—CH$_2$CH$_2$—N <br> $\quad\quad\quad$ H $\quad\quad\quad$ H $\quad\quad\quad$ H | Yellow Liquid (X-3) |
| $\quad\quad$ CH$_3$ $\quad\quad\quad$ O <br> HOCH$_2$—CH $\quad\quad\quad$ ‖ <br> $\quad\quad$ N—CH$_2$—CH$_2$—N—C—NH—C$_6$H$_5$ <br> $\quad\quad$ H $\quad\quad\quad\quad\quad$ H | Colorless Transparent Liquid (X-4) |
| $\quad\quad$ H O $\quad\quad$ O H <br> $C_4H_9$—N—C—$C_4H_8$—C—N—CH$_2$CH$_2$NH$_2$ | Yellow Liquid (X-5) |
| $\quad\quad$ O [ H $\quad\quad$ H O $\quad\quad$ O ] H <br> $C_{17}H_{33}$—C—[N—(CH$_2$)$_6$—N—C—$C_4H_8$—C—]$_3$ N—(CH$_2$)$_6$—NH$_2$ | Yellow Liquid (X-6) |
| $\quad\quad$ CH$_3$ <br> HOCH$_2$CH $\quad\quad\quad\quad\quad$ CH$_2$CH$_2$C≡N <br> $\quad\quad$ N—CH$_2$—⟨C$_6$H$_4$⟩—CH$_2$—N <br> $\quad\quad$ H $\quad\quad\quad\quad\quad\quad\quad$ H | Light-Yellow Liquid (X-7) |
| $\quad\quad$ CH$_3$ <br> HOCH$_2$CH $\quad\quad\quad\quad\quad$ CH$_3$ <br> $\quad\quad$ N—⟨C$_6$H$_4$⟩—CH$_2$—⟨C$_6$H$_4$⟩—N <br> $\quad\quad$ H $\quad\quad\quad\quad\quad\quad\quad$ H | Light-Yellow Solid (X-8) |
| $\quad\quad$ O $\quad\quad\quad\quad\quad\quad$ C$_9$H$_{19}$ <br> $C_7H_{15}$—C—N—(CH$_2$CH$_2$N)$_4$—CH$_2$CH$_2$N <br> $\quad\quad\quad$ H $\quad\quad\quad$ H $\quad\quad\quad\quad$ H | Brown Liquid (X-9) |
| $\quad\quad\quad\quad\quad$ CH$_2$CH$_2$C≡N <br> $\quad\quad\quad\quad\quad$ N <br> H $\quad\quad\quad\quad\quad$ H <br> H—N $\quad$ ⟨cyclohexane⟩ <br> $\quad$ H $\quad\quad$ H $\quad$ CH$_3$ | Brown Liquid (X-10) |
| $\quad\quad\quad\quad\quad\quad\quad\quad$ O <br> $\quad\quad\quad\quad\quad\quad\quad\quad$ ‖ <br> H $\quad\quad\quad\quad\quad\quad\quad$ C—C$_6$H$_5$ <br> N—CH$_2$—CH$_2$—N—CH$_2$CH$_2$N <br> H $\quad\quad\quad\quad$ H $\quad\quad\quad\quad$ H | Yellow Liquid |
| $\quad\quad\quad\quad\quad\quad$ O <br> $\quad\quad\quad\quad\quad\quad$ ‖ <br> H $\quad\quad\quad\quad\quad$ C—O—C$_6$H$_5$ <br> N—CH$_2$—CH$_2$—N <br> H $\quad\quad\quad\quad\quad$ H | Yellow Liquid |
| $\quad\quad\quad\quad\quad\quad$ O <br> $\quad\quad\quad\quad\quad\quad$ ‖ <br> H $\quad\quad\quad\quad\quad$ C—OC$_2$H$_5$ <br> N—CH$_2$—CH$_2$—N <br> H $\quad\quad\quad\quad\quad$ H | Yellow Liquid |
| H $\quad\quad\quad\quad$ CH$_2$—CH$_2$—O—C$_6$H$_5$ <br> N—CH$_2$CH$_2$—N <br> H $\quad\quad\quad\quad$ H | Yellow Liquid |
| $\quad\quad\quad\quad\quad\quad\quad\quad$ CH$_2$CH$_2$C≡N <br> $H_2N$—⟨C$_6$H$_4$⟩—O—⟨C$_6$H$_4$⟩—N <br> $\quad\quad\quad\quad\quad\quad\quad\quad$ H | White Solid |

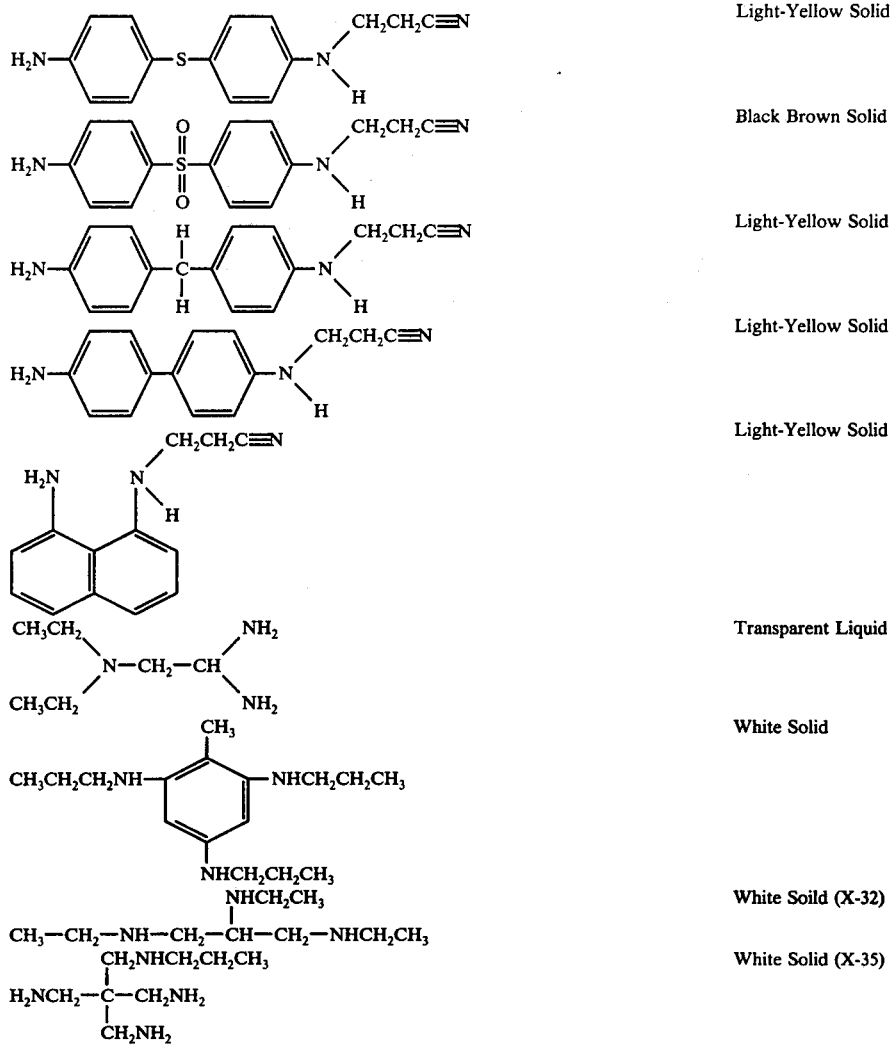

| | (Compound Designation) |
|---|---|
| | Light-Yellow Solid |
| | Black Brown Solid |
| | Light-Yellow Solid |
| | Light-Yellow Solid |
| | Light-Yellow Solid |
| | Transparent Liquid |
| | White Solid |
| | White Soild (X-32) |
| | White Solid (X-35) |

In the amine compounds represented by the general formula (II), it is essential as described above that at least one of the groups represented by $A^6$, $A^7$, and $A^8$ be a hydrogen atom or an organic group having a hydrogen atom active to an isocyanate group. Therefore, when $m_3$ is 0, it is essential that at least one of $A^6$ and $A^7$ be a hydrogen atom or an organic group having a hydrogen atom active to an isocyanate group. Examples of monovalent organic groups represented by $A^6$, $A^7$, and $A^8$ are the same as the monovalent organic group represented by $A^1$ to $A^5$ and described for the general formula (I).

Suitable examples of $A_r$ in the general formula (II) are an arylene group, or a divalent alicyclic group, such as

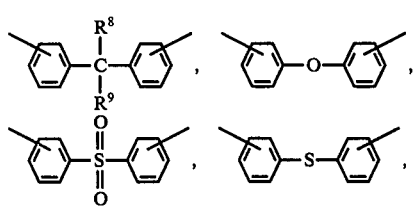

-continued

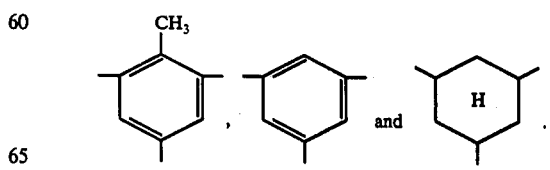

wherein $R^8$ and $R^9$ each represents a hydrogen atom or a lower alkyl group having, preferably, 1 to 8 carbon atoms. Suitable examples of $R^8$ and $R^9$ are a methyl group and a hydrogen atom. These groups may be substituted by an alkyl group having 1 to 22 carbon atoms. In this case, the number of carbons forming the ring of the alicyclic group is about 3 to 6.

When $A_r$ is a trivalent organic group, there are illustrated the following groups:

Typical samples of amine compounds represented by the general formula (II) are shown below:

| Structure | Description |
|---|---|
| HOCH₂CH₂HN—⌬—CH₂—⌬—NHCH₂CH₂OH | Yellow Solid (X-11) |
| (HO—CH(CH₃)CH₂)₂N—⌬—N(CH₂CH(OH)CH₃)₂ | Colorless Transparent Liquid (X-12) |
| H₂N—⌬—O—⌬—NH₂ | Light-Yellow Solid (X-13) |
| H₂N—(3-Cl)⌬—CH₂—⌬—NHCH₂CH(OH)CH₃ | Brown Solid (X-14) |
| HOCH₂CH₂(H)N—(cyclohexyl H)—N(H)CH₂CH₂OH | Light-Yellow Solid (X-15) |
| 3-aminophenol (⌬ with NH₂ and OH) | White Solid |
| ⌬—NHCH₂CH=CH₂ | White Solid |
| H₂N—⌬—SO₂—⌬—NH₂ | Black-Brown Solid |
| H₂N—⌬—S—⌬—NH₂ | Black-Brown Solid |
| H₂N—⌬—⌬—NH₂ | Light-Yellow Solid |
| 1,8-diaminonaphthalene | Light-Yellow Solid |
| HO—CH₂CH₂HN—⌬(1,3,5)—(NHCH₂CH₂OH)₂ | White Solid |
| (HOCH₂CH₂HN)₂—⌬—CH₂—⌬—(NHCH₂CH₂OH)₂ | White Solid |
| H₂N—(2-Cl)⌬—CH₂—(2-Cl)⌬—NH₂ | Brown Solid |

In the amine compounds represented by general formula (III), the monovalent organic groups represented by $A_9$, $A_{10}$, $A_{11}$, and $A_{12}$ are the same as the monovalent organic groups represented by $A^1$ to $A^5$ and described for general formula (I).

Typical examples of compounds represented by general formula (III) are shown below:

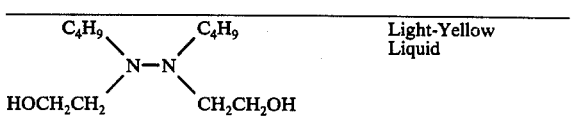

| | |
|---|---|
| (C₄H₉)(HOCH₂CH₂)N—N(C₄H₉)(CH₂CH₂OH) | Light-Yellow Liquid |

-continued

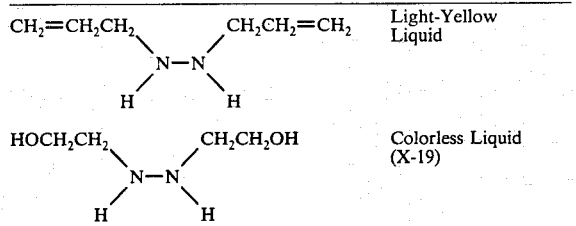
Light-Yellow Liquid

Colorless Liquid (X-19)

-continued

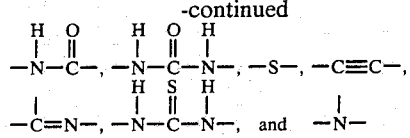

groupings in the groups.

Typical examples of compounds represented by general formula (IV) are shown below:

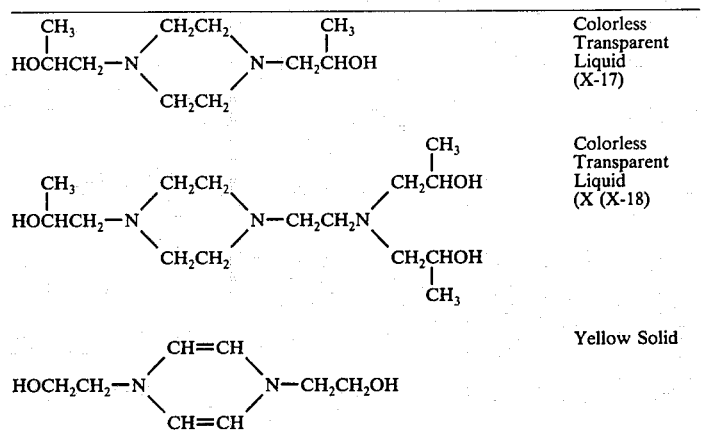

Colorless Transparent Liquid (X-17)

Colorless Transparent Liquid (X (X-18)

Yellow Solid

In the amine compounds represented by the general formula (IV), the monovalent organic groups represented by $A^{13}$ and $A^{14}$ are the same as the monovalent organic groups represented by $A^1$ to $A^5$ and described for the general formula (I). In addition, at least one of the $A^{13}$ and $A^{14}$ can be the group represented by the formula $$-R^{11}-N\begin{matrix}A^{27}\\A^{28}\end{matrix}$$

wherein $R^{11}$ represents a saturated or unsaturated alkylene group or a divalent alicyclic group and $A^{27}$ and $A^{28}$ each represents a hydrogen atom, or monovalent organic groups which are the same as those represented by $A^1$ to $A^5$ in the general formula (I). Suitable examples of the group $R^{11}$ are

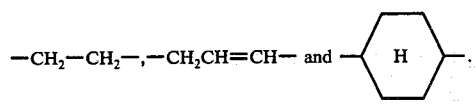

Examples of the divalent organic groups represented by $R^3$ and $R^4$ in the general formula (IV) are a saturated or unsaturated alkylene group, an arylene group, or a divalent alicyclic group. In this case, the alkylene group has about 1 to 22 carbon atoms and the number of carbons forming the ring of the alicyclic group is about 3 to 6. Furthermore, specific examples of these organic group are divalent organic groups containing

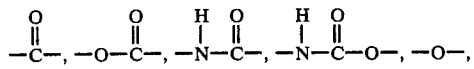

In the amine compounds represented by general formula (V), the monovalent organic groups shown by $A_{15}$ to $A_{19}$ are the same as the monovalent organic groups represented by $A^1$ to $A^5$ and described for general formula (I). Typical examples of compounds represented by general formula (V) are shown below:

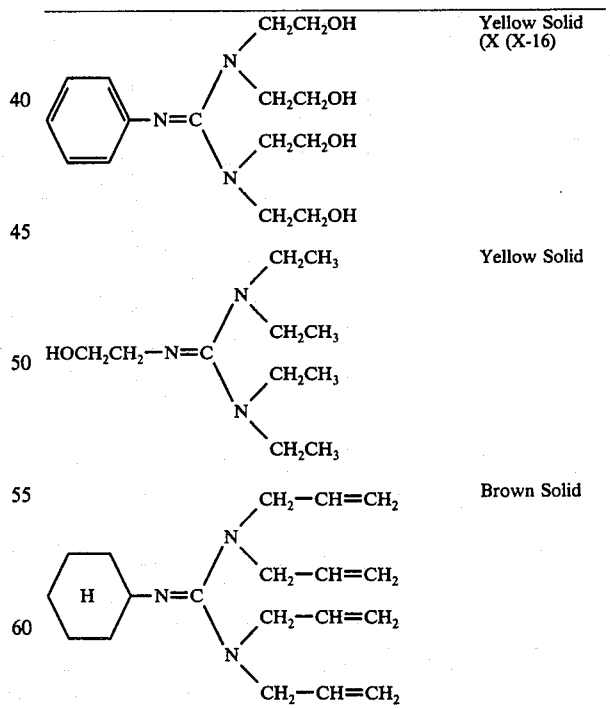

Yellow Solid (X (X-16)

Yellow Solid

Brown Solid

Examples of monovalent organic groups represented by $A^{20}$ to $A^{24}$ in the general formula (VI) are the same as the monovalent organic groups represented by $A^1$ to $A^5$ and described for the formula (I).

Examples of the divalent organic groups represented by $R^5$ and $R^6$ are the same as the divalent organic groups represented by $R^1$ and $R^2$, respectively, previously described for the formula (I).
Typical examples of amine compounds represented by the general formula (VI) are shown below:
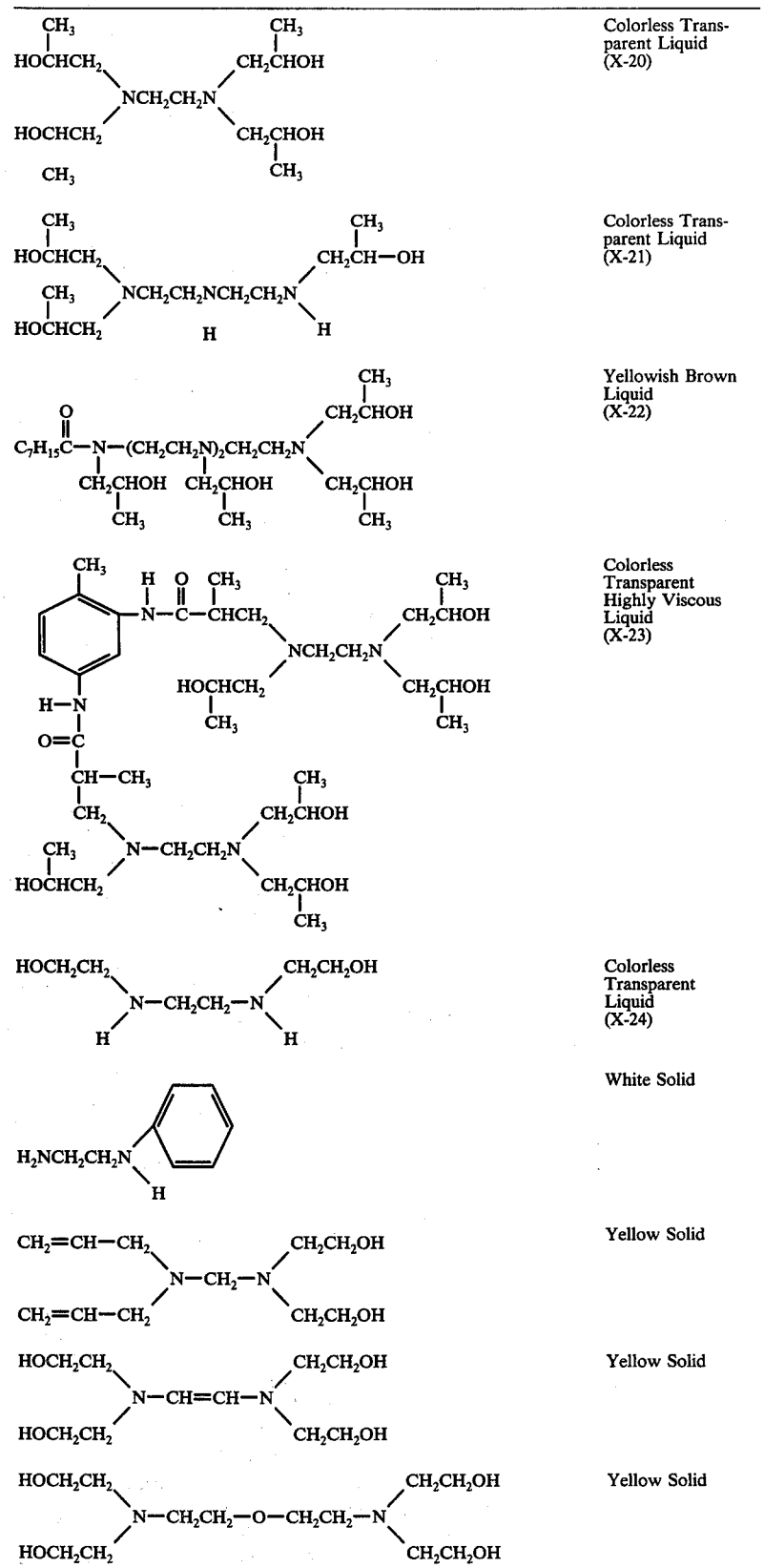

Examples of monovalent organic groups represented by $A^{25}$ and $A^{26}$ in the general formula (VII) are the same as the monovalent organic groups represented by $A^1$ to $A^5$ and described for the formula (I). Examples of organic groups represented by $R^7$ in the general formula (VII) are a monovalent, divalent, or trivalent saturated or unsaturated aliphatic hydrocarbon group, an aromatic hydrocarbon group, an alicyclic group, hydroxy-substituted groups of these aliphatic, aromatic and alicyclic groups, and the aforesaid groups each substituted by a saturated or unsaturated alkyl group having about 1 to 10 carbon atoms or an aryl group. The number of carbon atoms of the aliphatic hydrocarbon group ranges from about 1 to 22 and the number of carbons forming the ring of the alicyclic group ranges from about 3 to 6. Other examples of $R^7$ are

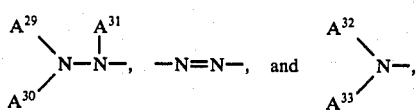

wherein $A^{29}$, $A^{30}$, $A^{31}$, $A^{32}$, and $A^{33}$ each represents the same monovalent organic groups represented by $A^1$ to $A^5$ and described for the formula (I) or a hydrogen atom. In the amine compounds of the general formula (VII), it is essential at least one of $R_7$, $A_{25}$, and $A_{26}$ be a hydrogen atom or a group having a hydrogen atom active to an isocyanate group and examples of groups having an active hydrogen atom are a hydroxyl-substituted alkyl group and an alkyl group substituted with an -SH group.

Typical examples of compounds represented by general formula (VII) are shown below:

| | |
|---|---|
| 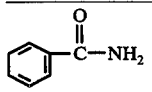 | White Solid (X-31) |

Even in the case of using the above-described amine compound individually, quite excellent flame resisting effects can be obtained without the necessity of using a phosphorus-containing compound when a polyetherpolyol having a polyoxyethylene chain or polyesterpolyol prepared by using a polyglycol containing ethylene glycol is used as the foaming material together with the amine compound.

As described above, by blending the amine compound represented by general formula (I), (II), (III), (IV), (V), (VI), or (VII) individually in the production of polyurethane foam, it is possible to render the polyurethane foam flame resistant but when two or more such amine compounds are used together, even more excellent flame resisting effects can be obtained. However, the synergistic effect due to the combination of the amine compounds of general formulae (I) to (VII) differs considerably depending on the kinds of compounds combined. That is, the combinations of the amine compounds belonging to each general formula, which can give the most preferred resistance to burning, are as follows:

A combination of at least one amine compound represented by the general formula (I) and at least one amine compound represented by the general formula (II), (III), (IV), or (V).

A combination of at least one amine compound represented by the general formula (I) and at least one amine compound represented by the general formula (VI).

A combination of at least one amine compound represented by the general formula (II), (III), (IV), or (V) and at least one amine compound represented by the general formula (VII).

Also preferred combinations in addition to the above especially preferred combinations are as follows:

A combination of at least one amine compound represented by the general formula (I) and at least one amine compound represented by the general formula (VII).

A combination of at least one amine compound represented by the general formula (VI) and at least one amine compound represented by the general formula (VII).

The following combinations are also preferred combinations but not to the extent of the above described two classes:

A combination of at least one amine compound represented by the general formula (II), (III), (IV), or (V) and at least one amine compound represented by the general formula (VI).

All of these above combinations of amine compounds provide even more improved effects to the superior effects provided by the above amine compounds used individually.

Furthermore, when three kinds of amine compounds selected from the groups belonging to the compounds of the general formulae (I) to (VII), respectively, even more improved excellent flame resisting effects than the case of using two kinds of amine compounds is obtained. Further, when four kinds of the amine compounds selected from the groups belonging to the compounds of general formulae (I) to (VII), respectively, are used, the results obtained are more excellent than when only two and only three kinds of amine compounds are employed.

The polyurethane foam obtained using the aforesaid amine compounds individually together with an optimum polyetherpolyol and an optimum silicone oil without using a flame retarder is self-extinguishing with a burning distance of 14 to 22 mm as tested in accordance with ASTM1692-68. When two kinds of amine compounds selected from the two groups described above were used without adding a flame retarder, the polyurethane foams thus prepared show self-extinguishing properties with a burning distance of 0 to 4 mm using the ASTM 1692-68 test in any of the combinations and further when four kinds of the amine compounds selected from the four groups are used without employing a flame retarder, the burning distance is 0 mm (i.e., non burning) using the ASTM 1692-68 test in all cases.

The total amount of the aforesaid amine compounds necessary for providing these excellent flame resisting effects to polyurethane foams is 0.1 to 5 parts by weight, preferably 0.3 to 3 parts by weight, most preferably 0.5 to 2 parts by weight, to 100 parts by weight of the polyetherpolyol or the polyesterpolyol used.

In the present invention, a flame retarder can be used in combination with the aforesaid amine compound or compounds although as is apparent from the above set forth results, the flame resisting effects can be obtained without using such flame retarder. Suitable flame retarders which can be used in this invention in such a case are phosphorus-containing compounds. Examples of these phosphorus-containing compounds are those compounds containing phosphorus only and which do not contain any halogen, such as, for example, triphenyl phosphate, tricresyl phosphate, diethyl-N,N-bis(2-hydroxyethyl)aminomethyl phosphonate. Vircol 82 (trade name, the structure of which is believed to be

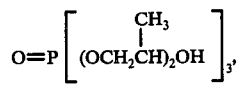

produced by Mobil Oil Co.), ammonium polyphosphate, bis(dipropylene glycol)dipropylene glycol phosphonate, tri(dipropylene glycol) phosphite, heptaquisdipropylene glycol triphosphite, trimethyl phosphate, triethyl phosphate, tributyl phosphate and trioctyl phosphate.

Compounds containing phosphorus and halogen can be also used as the flame retarder where desired and examples of such compounds are tri-2,3-dibromopropyl phosphate, trischloroethyl phosphate, trisdichloropropyl phosphate, Phosgard 2XC-20 (trade name of Monsanto Chemical Co. for a product having the formula

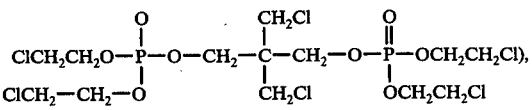

and monodichloropropylbis(dibromopropyl) phosphate.

Compounds containing phosphorus and halogen provide superior flame resisting effects to the effects obtained with a compound containing phosphorus only and this is believed to be based on the synergistic effect of the phosphorus and halogen. The above-described compounds can be used individually or in combination.

Furthermore, if desired, the aforesaid phosphorus-containing compound can be used together with an organo halogen compound such as tetrabromophthalic anhydride, tetrabromobisphenol A, tetrabromobutane, hexabromobenzene, dichloropropanol, and dibromopropanol.

The amount of the phosphorus-containing compound used in this invention can be much smaller than the amount employed using conventional technique and can be less than about 0.5% by weight to the weight of polyurethane foam.

Furthermore, in the present invention the flame resisting effects of polyurethane foam can be further improved by using a silicone oil, preferably a silicone oil having a mean molecular weight of about 2000 to 5000 in the polyalkyol siloxane hydrophobic group portion together with the aforesaid amine compound or compounds. The term "polyalkylsiloxane hydrophobic group portion" as used herein the description of this invention means the portion of silicone oil which does not contain the hydrophilic polyoxyalkylene group portion.

Examples of the silicone oils used in this invention are those compounds represented by the following three general formulae:

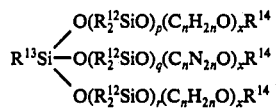
(A)

where $R^{12}$, $R^{13}$, and $R^{14}$ each represents an alkyl group having 1 to 4 carbon atoms; $p$, $q$, and $r$ each represents a number of 1 to 4; and $(C_nH_{2n}O)_x$ is a mixed polyoxyethylene-oxypropylene block containing 15 to 19 oxyethylene units ($n=2$) and 11 to 15 oxypropylene units ($n=3$), with the total of the polyoxyethylene units and polyoxypropylene units, $x$, ranging from about 26 to 34.

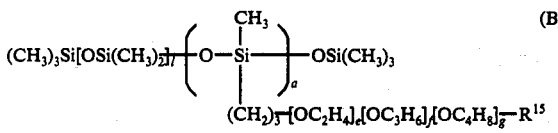
(B)

wherein the sum of $e + f + g$ is a mean value of 25 to 80, the $e$ moiety, the $f$ moiety and $g$ moiety being present in the chain in any order and the ratio of the total number of oxygen atoms in the $e$ moiety, the $f$ moiety and $g$ moiety to the number of oxygen atoms in the $e$ moiety ranging from 2.3 to 1 to 2.8 to 1, with the sum of $e + f + g$ having a mean value ranging from 25 to 80. $R^{15}$ represents

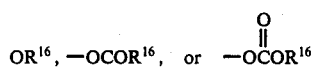

(wherein $R^{16}$ represents a hydrocarbon group free from any unsaturation and having less than 10 carbon atoms); $a$ is 3 to 4; and $l$ is a mean value of 6 to 30. In the above formula (B), since propylene oxide, butylene oxide and ethylene oxide which constitute the hydrophobic group moiety have different molecular weights from each other, it is impossible to represent the ratio of ethylene oxide to the other alkylene oxides in terms of a weight ratio when they are mixed. However, the weight ratio of ethylene oxide groups to the other alkylene oxide groups can simply be represented if it is referred to as a ratio of the oxygen in the alkylene oxide groups to the oxygen in the entire oxyalkylene block. According to this definition, the ratio of the number of oxygen atoms derived from the ethylene oxide groups/the number of oxygen atoms derived from the other alkylene oxide groups is 2.3 : 1 to 2.8 : 1.

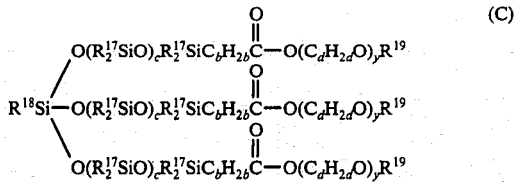
(C)

wherein $R^{17}$ and $R^{18}$ each represents a monovalent hydrocarbon group; $R^{19}$ represents a lower alkyl group; $c$ is a number of at least 2; $b$ is a number of 2 or 3; $d$ is a number of 2 to 4; and $y$ is a number of at least 5.

In addition, the polyalkylenesiloxane hydrophobic group portion of the compound of the formula (A) shown above means the portion

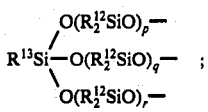

the hydrophobic group portion in the compound of the formula (B) means the portion

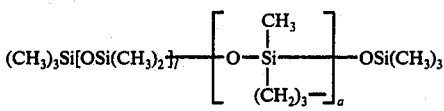

and the hydrophobic group portion in the compound of the formula (C) means the portion

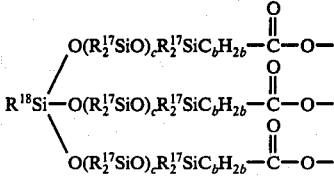

Any silicone oils of above-described formulae (A), (B), and (C) can be used in this invention but other silicone oils can be also used in this invention. Other examples of silicone oils which can be used in this invention are those shown by the formula (D)

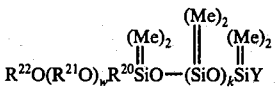
(D)

wherein the moleuclar weight of

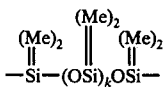

group portion ranges from 5 to 60% to the total molecular weight of the silicone oil; the molecular weight of the $-(R^{21}O)_w-$ group portion is at least 25% by weight of the total molecular weight of the silicone oil; the total molecular weight of the

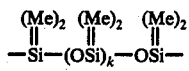

group and the $-(R^{21}O)_w-$ group is larger than 50% by weight of the total molecular weight of the silicone oil; Me represents a methyl group; $R^{22}$ represents a hydrogen atom, a monovalent hydrocarbon group, or a monovalent hydrocarbonoxy group; $R^{21}$ represents an alkylene group having 2 to 4 carbon atoms; w is an integer of 4 to 2000; $R^{20}$ represents a divalent non-aromatic hydrocarbon group or a divalent non-aromatic hydroxy-substituted hydrocarbon group; this group being connected to the silicon atom through a silicon-carbon bond; k is 0 or a positive integer; and Y represents a monovalent hydrocarbon group or a monovalent hydrocarbonoxy group.

Furthermore, the silicone oil represented by the following formula (E) can be also used in this invention.

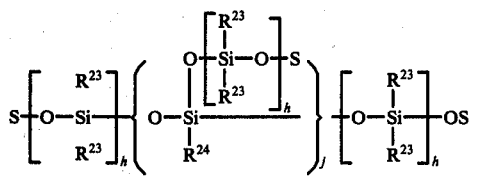

wherein h is an integer of 4 to 10; j is an integer of 2 to the integer of h (i.e., when h is 4, for example, j is 2 to 4 and when h is 10, j is 2 to 10); $R^{23}$ and $R^{24}$, which may be the same or different, each represents a hydrocarbon residue, the hydrocarbon residues $R^{23}$ connected to the same silicon atom may be the same or different; S represents $-(C_2H_4O)_u(C_3H_6O)_vR^{25}$; u + v is 15 to 60; v is a value between 0.4u and 3u; and $R^{25}$ represents a hydrocarbon residue in same or different residue S.

Any of the silicone oils described above can be used in this invention but the preferred molecular weight of the polyalkylsiloxane hydrophobic group portion in the silicone oil molecule is about 2000 to 5000 and the most preferred molecular weight thereof is 3000 to 4000. That is, if the molecular weight of the polyalkylsiloxane hydrophobic group portion is less than 2000, the flame effect of the polyurethane foam is less, while if the molecular weight is higher than 5000, the foaming controlling effect due to the silicone oil is too great.

Therefore, in the silicone oils which can effectively be used in this invention, it is necessary that $R^{13}$, $R^{12}$, p, q and r in the silicone oils of the general formula (A); l and a in the silicone oils of the general formula (B); and $R^{17}$, $R^{18}$ and c in the silicon oils of the general formula (C) be so selected that the molecular weight of the polyalkylsiloxane hydrophobic group moiety is in the aforesaid range.

The above-described silicone oils can be used individually or in combination in this invention, and also the silicone oil can be used together with other silicone oils in addition to those described above. In the latter case, the amount of other silicone oils is lower than 2% by weight, preferably lower than about 1.2% to the weight of the polyetherpolyol or the polyesterpolyol to be used.

Also, the amount of the silicone oil or silicone oils used in this invention is lower than about 2% by weight, preferably lower than about 1.2% by weight of the weight of the polyetherpolyol or the polyesterpolyol which is a predominant raw material in this invention. That is, if the proportion of the silicone oil is higher than 2% by weight, the plasticizing effect due to the silicone oil is too high, which results in a reduction in the properties of polyurethane foam. Therefore, on considering the properties of polyurethane foam, the amount of the silicone oil used in the foam of this invention is preferably lower than 2% by weight, and is generally about 0.3 to 2% by weight, preferably 0.5 to 1.2% of the weight of the polyetherpolyol or the polyesterpolyol. However, the performance of the silicone oil greatly depends upon the chemical structure of the silicone oil and hence the optimum amount can vary within the above range.

The polyetherpolyol or the polyesterpolyol used in this invention can be freely selected to achieve the desired polyurethane foam. That is, as the polyetherpolyol or polyesterpolyol for soft polyurethane foam, polyols having a hydroxyl value of about 20 to 150 mg KOH/g can be used individually or as a mixture thereof.

Also, as a specific method, a method of producing a soft polyurethane foam using a combination of a polyetherpolyol or polyesterpolyol, each having a hydroxyl value of about 20 to 40 mg KOH/g and a polyetherpolyol or polyesterpolyol having a hydroxyl value of about 400 to 1000 mg KOH/g is known. Such an approach is also suitable for use in this invention as well.

The polyetherpolyol used in this invention can be prepared by the addition polymerization reaction of an organic compound having at least two active hydrogen atoms and an alkylene oxide.

Examples of organic compounds having at least two hydrogen atoms which can be used as the raw material for producing the polyetherpolyol suitable for this invention are an alkylene glycol such as ethylene glycol, diethylene glycol, triethylene glycol, propylene glycol, dipropylene glycol, tripropylene glycol, butane-2,3-diol, butane-1,3-diol, hexane-2,5-diol, octadecanediol, octadecenediol, cyclohexane-1,4-dimethanol, glycerine, trimethylolethane, trimethylolpropane, pentaerythritol, mannitol, sorbitol, ethylenediamine, diethanolamine, triethanolamine, ammonia, and sucrose.

Also, suitable examples of alkylene oxides which can be used for the addition polymerization reaction are ethylene oxide, propylene oxide, butylene oxide, epichlorohydrin, and the like.

It is possible in this invention to use the polyetherpolyol prepared by addition polymerizing the alkylene oxide and a mixture of two or more of the above described raw materials having at least two active hydrogen atoms and further it is also possible to use the polyetherpolyol prepared by random- or block-copolymerizing two or more alkylene oxides.

Moreover, the polyesterpolyol used in this invention can be prepared by the polymerization reaction of a polyol having at least two active hydroxyl groups and a polybasic acid.

Examples of the polyols are, as in the case of polyetherpolyols, an alkylene glycol such as ethylene glycol, diethylene glycol, triethylene glycol, propylene glycol, dipropylene glycol, tripropylene glycol, butane-2,3-diol, butane-1,3-diol, hexene-2,5-diol, octadecanediol, octadecenediol, cyclohexane-1,4-dimethanol, glycerine, trimethylolethane, trimethylolpropane, pentaerythritol, mannitol, sorbitol, sucrose, etc.

Examples of suitable polybasic acids are adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzenetricarboxylic acid, thiodiglycolic acid, thiodipropionic acid, maleic acid, fumaric acid, citraconic acid, itaconic acid, trimellitic acid, a dimerized or trimerized fatty acid, tartaric acid, etc.

Depending on the kind of polyurethane foam to be produced, higher flame resisting effects can be obtained as the case may be when the polyetherpolyol or the polyesterpolyol contains oxyethylene groups. In this case, such a purpose can be easily attained by using ethylene oxide or ethylene glycol as a part of the raw material for the production of the polyetherpolyol or the polyesterpolyol.

The polyisocyanate used in the present invention is a material conventionally used for producing polyurethane foams in the art and can be appropriately represented by the general formula $$R^{26}(NCO)_{n_3}$$

wherein $R^{26}$ represents an alkyl group, an aryl group, a substituted alkyl group, or a substituted aryl group and $n_3$ has a mean value of 1.5 to 3.0. Examples of the group $R^{26}$ are —$C_6H_{12}$—, 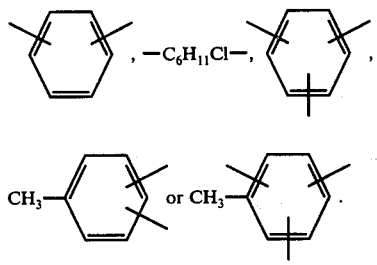

Typical examples of the above-described polyisocyanate are ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene diisocyanate, xylene diisocyanate, 1,4-naphthylene diisocyanate, 1,5-naphthylene diisocyanate, diphenyl-4,4'-diIsocyanate, azobenzene-4,4'- diisocyanate, diphenylsulfone-4,4'-diisocyanate, dichlorohexamethylene diisocyanate, tetramethylene diisocyanate, pentamethylene diisocyanate, hexamethylene diisocyanate, furfurylidene diisocyanate, 1-chlorobenzene-2,4-diisocyanate, triisoprepenylbenzene diisocyanate, p-isocyanatophenylthiophosphoric acid triester, p-isocyanatophenyl-phosphoric acid triester, 1-(isocyanatophenyl)-ethylisocyanate, 4,4',4''-triisocyanatotriphenylmethane, 1,3,5-triisocyanatobenzene, 2,4,6-triisocyanatotriene, 4,4'-dimethyldiphenylmethane-2,2',5,5'-tetraisocyanate, and the like. They may be used individually or as a mixture thereof.

Of the above-described polyisocyanates, the most widely used polyisocyanates are tolylene diisocyanate, crude polymethylenepolyphenyl isocyanate, crude tolylene diisocyanate, etc., and mixtures thereof.

The use of a mixture of these polyisocyanates give ordinary preferably results for flame resisting effects and, in particular, a mixture of 60 to 98% by weight of tolylene diisocyanate and 40 to 2% by weight of crude polymethylenepolyphenyl isocyanate gives a preferred synergistic effect with the flame retarders used in this invention.

Examples of catalysts which can be used in this invention are amine catalysts such as triethylamine, triethylenediamine, tetramethylethylenediamine, dimethylethanolamine, and the like and metal carboxylates as stannous octoate, dibutyltin dilaurate, lead octylate, and the like. That is, any catalysts which have been used conventionally for the production of polyurethane foams can be used in this invention.

A suitable amount of the catalyst is about 0.01 to 2% by weight, preferably 0.05 to 1% by weight of the polyetherpolyol or the polyesterpolyol.

Any materials conventionally employed as the foaming agents for polyurethane foams can be used in this invention. These foaming agents are well known and a few specific examples of these agents are monofluorotrichloromethane, methylene chloride, water, etc. The amount of the foaming agent is suitably about 0.5 to 6 parts by weight of 100 parts by weight of the polyetherpolyol or the polyesterpolyol when water is employed as the foaming agent and is about 2 to 70 parts by weight when a volatile foaming agent is employed.

Furthermore, when a silicone oil or silicone oils are used in the present invention, an emulsifying agent can be used and in such a case, an appropriate emulsifying agent can be selected on considering the use of the polyurethane foam prepared. Examples of commercially available emulsifying agents are F-220, F-230, and F-260 (trade names, made by Shinetsu Chemical Industry Co.); L-520 and L-540 (trade names, made by Union Carbide Corp.); DC-190, DC-192, and DC-194 (trade names, made by Dow Corning Co.); etc. However, the emulsifying agent for silicone oil has an important effect on the flame resisting effects and in this invention better results are obtained when the molecular weight of the polysiloxane residue of a silicone oil emulsifying agent is about 2000 to 5000, preferably 3000 to 4000 and when the molecular weight of the polyoxyalkylene chain is about 2000 to 4000, preferably 2500 to 3000. In addition, the use of a combination of two or more emulsifying agents for the silicone oil usually provides even more excellent effect.

Various methods of preparing polyurethane foams are described in Japanese Patent Pub. Nos. 7541/'56, 4241/'56, 5742/'57, 7094/'58, 9275/'59, 17498/'60, 8195/'61, 7895/'62, 6000/'63, 2097/'64, 12639/'66, 10630/'67, 19039/'68, 21318/'68, 40075/'70, etc., and according to the most practical method of those known methods, a polyetherpolyol (or a polyesterpolyol), polyisocyanate, a foaming agent, a catalyst, and other additives, for example, dyes, pigments, fillers, antioxidants, plasticizers and the like are uniformly blended in a short period of time followed by foaming and molding and then the foamed product is heated externally or is allowed to stand to complete the curing of the product. Also, a similar method to about in which, however, the polyetherpolyol and the polyisocyanate have been partially or completely reacted with each other prior to the blending is useful and has been widely employed. The polyurethane foam can be prepared according to any of Table 3-continued

| Trade Name | Manufacturer |
|---|---|
| F-220 (Type B) | Shinetsu Chemical Industry Co. | ponents except for the polyisocyanate were added to the polyetherpolyol followed by mixing. Then, the temperature of the mixture was adjusted to 25° C ±1° C.

Thereafter, the polyisocyanate, the temperature of

Table 4

| Silicone Oil No. | Molecular Weight of Polymethylsiloxane Chain | General Formula Type | p + q + r | n | x | $R^{12}, R^{13}, R^{14}$ | Molecular Weight of Polyoxyalkylene Chain | Content of* Oxyethylene Chain in Polyoxyalkylene Chain |
|---|---|---|---|---|---|---|---|---|
| S - 1 | 1,800 | (A) | 22 | 2.6 | 33 | $R^{12} = CH_3, R^{13} = CH_3, n-C_4H_9$ | 1,800 | 40 |
| S - 2 | 2,200 | (A) | 27 | 2.6 | 33 | $R^{12} = CH_3, R^{13} = CH_3, n-C_4H_9$ | 1,800 | 40 |
| S - 3 | 3,500 | (A) | 44 | 2.6 | 33 | $R^{12} = CH_3, R^{13} = CH_3, n-C_4H_9$ | 1,800 | 40 |
| S - 4 | 4,200 | (A) | 53 | 2.6 | 33 | $R^{12} = CH_3, R^{13} = CH_3, n-C_4H_9$ | 1,800 | 40 |
|  |  |  | a   l | e/f/g Moiety | | e + f + g    $R^{15}$ | | |
| S - 5 | 1,800 | (B) | 4   18 | Ethylene & Propylene | | 42    $C_4H_9O—$ | 2,200 | 50 |
| S - 6 | 2,200 | (B) | 4   23 | Ethylene & Propylene | | 42    $C_4H_9O—$ | 2,200 | 50 |
| S - 7 | 3,500 | (B) | 4   40 | Ethylene & Propylene | | 42    $C_4H_9O—$ | 2,200 | 50 |
| S - 8 | 4,200 | (B) | 4   49 | Ethylene & Propylene | | 42    $C_4H_9O—$ | 2,200 | 50 |
|  |  |  | b   c | d | y | $R^{17}, R^{18}, R^{19}$ | | |
| S - 9 | 1,800 | (C) | 2   22 | 2.55 | 33 | $R^{17} = CH_3, R^{18} = CH_3, n-C_4H_9$ | 1,800 | 45 |
| S - 10 | 2,200 | (C) | 2   27 | 2.55 | 33 | $R^{17} = CH_3, R^{18} = CH_3, n-C_4H_9$ | 1,800 | 45 |
| 5 - 11 | 3,500 | (C) | 2   43 | 2.55 | 33 | $R^{17} = CH_3, R^{18} = CH_3, n-C_4H_9$ | 1,800 | 45 |
| S - 12 | 4,800 | (C) | 2   60 | 2.55 | 33 | $R^{17} = CH_3, R^{18} = CH_3, n-C_4H_9$ | 1,800 | 45 |
| S - 13 | 3,000 | (A) | 37 | 2.5 | 42 | $R^{12} = CH_3, R^{13} = CH_3, n-C_4H_9$ | 2,200 | 50 |
| S - 14 | 3,000 | (A) | 37 | 2.4 | 43 | $R^{12} = CH_3, R^{13} = CH_3, n-C_4H_9$ | 2,200 | 60 |
| S - 15 | 5,200 | (A) | 66 | 2.5 | 42 | $R^{12} = CH_3, R^{13} = CH_3, n-C_4H_9$ | 2,200 | 50 |

*The content is shown by weight percent. The polyoxyalkylene chain is composed of an oxypropylene chain and an oxyethylene chain, the chain each having a terminal n-butyl group, and the number of the polyoxyalkylene chains per molecule was 3.

After preparing the raw materials as described above, soft polyurethane foams were prepared as shown in the following examples.

EXAMPLE 1

Soft polyurethane foams were prepared using the amine compounds, the flame retarders, and the polyetherpolyols prepared as previously described. The compositions for forming polyurethane foams, the foaming techniques, and the method of testing the flame resistance employed in this example were as follows:

| Composition | | |
|---|---|---|
| Polyetherpolyol[1] | 100 | parts by weight |
| Water | 4.5 | parts by weight |
| Freon 11[2] | 7 | parts by weight |
| Silicone Oil[3] | 1.2 | parts by weight |
| Dabco[4] | variable | |
| T-9[5] | variable | |
| N-Ethylmorpholine | 0.3 | part by weight |
| Phosphorus-Containing Compound[1] | variable | |
| Amine Compound[1] | variable | |
| Tolylene Diisocyanate[6] | 108 (index)[7] | |

Note:
[1]As shown in Table 5.
[2]Trade name of monofluorotrichloromethane, produced by Daikin Industry Co.
[3]Emulsifying agent, S-2 shown in Table 4.
[4]Trade name of triethyleneamine, produced by Houdry Process & Chemical Co.
[5]Trade name of stannous octoate, produced by M & T Chemical Co.
[6]Product, produced by Nippon Polyurethane Co.
[7]The term "108 (index)" means that the amount of tolylene diisocyanate is larger than the equivalent amount of the hydroxyl group to be reacted with tolylene diisocyanate by 8%.

Foaming Preocedure

In a two liter polyethylene beaker was placed 1 kg of the polyetherpolyol and then all of the remaining components except for the polyisocyanate were added to the polyetherpolyol followed by mixing. Then, the temperature of the mixture was adjusted to 25° C ±1° C was poured into the mixture and then the mixture was immediately mixed for 5 seconds using a mixer at 4500 r.p.m. The product thus obtained was poured into a steel box. Foaming occurred within 20 seconds and when the system was allowed to foam freely, foaming was completed in 150 seconds. Thereafter, the foamed product was immediately placed in a curing oven and was cured for 15 minutes at 120° C. Then, the foamed product was withdrawn from the oven, allowed to stand, for a period of time longer than 24 hours at room temprature (about 20° to 30° C) and cut into pieces for measuring the various properties thereof. The results showed that all foams prepared had good appearance and were open cellular type eleastic foams.

Flame Test

The flame test was conducted according to the methods of American Standard of Testing Method D1692-68 (ASTM D1692-68) and of Motor Vehicle Safety Standard No. 302 (MVSS 302) and the result was evaluated by the burning distance (mm) in each case. In addition, however, the distance between the first marked line and the second marked line of the sample piece was 100 mm. in the case of ASTM D1692-68 and was 254 mm. in the case of MVSS 302.

Test Results

The relation between the amine compounds and the flame resitance of the foams prepared is shown in Table 5, in which all of numeral values shown by parts were based 100 parts by weight of the polyetherpolyol.

Table 5

| Polyetherpolyol | Amine Compound | | Dabco (part by wt.) | T-9 (part by wt.) | Phosphorus-Containing Compound | | Foam Density (kg/m³) | Burning Distance (mm) | |
|---|---|---|---|---|---|---|---|---|---|
|  | No. | (part by wt.) | | | No. | (part by wt.) | | ASTM 1692-68 | MVSS 302 |
| F-2 | X- 1 | 2 | 0.1 | 0.20 | — | — | 20.5 | 31 | 6 |
| F-2 | X- 2 | 2 | 0.1 | 0.18 | — | — | 20.2 | 44 | 7 |
| F-2 | X- 3 | 2 | 0.1 | 0.22 | — | — | 19.8 | 38 | 12 | the above-described methods or can be prepared using other methods to achieve the objects of this invention.

Now, the invention will be described further by reference to following examples. Unless otherwise indicated, all parts, percents, ratios and the like are by weight.

To confirm the effects and advantages of this invention, Compounds X-1 to X-31, described hereinabove were prepared and furthermore for the purpose of comparison the compounds shown by the following formulae were also prepared.

| Structure | Description |
|---|---|
| N(CH₂CH₂OH)₃ | Colorless Transparent Liquid (Y-1) |
| H₂NCH₂CH₂N(H)—CH₂CH₂—N(CH₃)—CH₂CH₂NH₂ | Brown Liquid (Y-2) |
| H—N(CH₂CHOHCH₃)₂ | White Solid (Y-3) |
| HOCH₂CH₂N(H)—CH₂CH₂—N(H)H | Colorless Transparent Liquid (Y-4) |
| C₆H₅—NH₂ | Red Transparent Liquid (Y-5) |
| C₆H₅—N(CH₂CHOHCH₃)₂ | Light-Yellow Transparent Liquid (Y-6) |
| C₆H₅—NH—C(CH₃)₂—CH₂OH | White Solid (Y-7) |
| C₁₇H₃₅NH₂ | Light-Yellow Solid (Y-8) |
| HOCH₂CH₂NH₂ | Colorless Transparent Liquid (Y-9) |
| C₆H₅—NHC₂H₅ | Colorless Transparent Liquid (Y-10) |

It will readily be understood that the above-described compounds prepared for the purposes of comparison are different from and outside the scope of the amine compounds of this invention since each of Compounds Y-1, Y-3, Y-5, Y-6, Y-7, Y-8, Y-9, and Y-10 has only one nitrogen atom in the molecule, Compound Y-2 has four hydrogen atoms directly connected to the nitrogen atom although the compound may be considered similar to the compound of general formula (I) in this invention, and also Compound Y-4 has connected to the nitrogen atom only one group having a hydroxy-substituted group although the compound may also be considered similar to the compound of general formula (VI) in this invention.

The polyetherpolyols for soft polyurethane foams as shown in Table 1 were prepared by addition-polymerizing propylene oxide and, if necessary, ethylene oxide, the content of which was expressed by a polyoxyethylene chain content, to the starting materials shown in the same table. In addition, the polyoxyethylene chain content in the table is expressed by the weight percent of ethylene oxide to the total weight of the alkylene oxide used and the terminal primary hydroxyl group content was expressed by the ratio of the number of the terminal primary hydroxyl groups to the total number of the hydroxyl groups contained in the polyetherpolyol.

Table 1

| Polyether-polyol | Starting Material | Hydroxyl Value (mgKOH/g) | Polyoxyethylene Chain Content (weight %) | Terminal Primary Hydroxyl Group Content (weight %) |
|---|---|---|---|---|
| F-1 | Glycerine | 56.1 | 0 | 4 |
| F-2 | Glycerine | 48.0 | 4 | 40 |
| F-3 | Pentaerythritol | 34.2 | 15 | 75 |
| F-4 | Trimethylol Propane | 48.2 | 6 | 4 |
| F-5 | Trimethylol Propane | 56.1 | 10 | 50 |
| F-6 | Sorbitol | 56.1 | 10 | 50 |
| F-7 | Ammonia | 56.1 | 10 | 50 |
| F-8 | Sucrose | 56.1 | 10 | 50 |
| F-9 | Glycerine | 48.2 | 16 | 40 |
| F-10 | Glycerine | 48.2 | 16 | 5 |
| F-11 | Sucrose | 56.1 | 0 | 4 |

Als, the phosphorus-containing compounds as shown in Table 2 were prepared as flame retarders and further the silicon compounds as shown in Table 3 and Table 4 were utilized.

Table 2

| Phosphorus-Containing Compound No. | Chemical Name or Trade Name | Phosphorus Content in the Compound % |
|---|---|---|
| P-1 | Trischloroethyl phosphate | 10.8 |
| P-2 | tris-2,3-Dibromopropyl phosphate | 4.4 |
| P-3 | Fyrol 6* | 12.9 |

*Trade name for diethyl-N,N-bis(2-hydroxyethyl)aminomethyl phosphate, produced by Staufer Chemicals Co.

Table 3

| Trade Name | Manufacturer |
|---|---|
| L-5340 (Type B) | Union Carbide Corp. |

Table 5-continued

| Polyether-polyol | Amine Compound No. | (part by wt.) | Dabco (part by wt.) | T-9 (part by wt.) | Phosphorus-Containing Compound No. | (part by wt.) | Foam Density (kg/m³) | Burning Distance (mm) ASTM 1692-68 | MVSS 302 |
|---|---|---|---|---|---|---|---|---|---|
| F-2 | X-4 | 2 | 0.1 | 0.18 | — | — | 21.0 | 48 | 7 |
| F-2 | X-5 | 2 | 0.1 | 0.22 | — | — | 19.9 | 29 | 6 |
| F-2 | X-6 | 2 | 0.1 | 0.22 | — | — | 20.6 | 36 | 8 |
| F-2 | x-7 | 2 | 0.1 | 0.18 | — | — | 20.3 | 45 | 10 |
| F-2 | X-8 | 2 | 0.1 | 0.18 | — | — | 20.9 | 48 | 10 |
| F-2 | X-9 | 2 | 0.1 | 0.16 | — | — | 20.2 | 50 | 49 |
| F-2 | X-10 | 2 | 0.1 | 0.18 | — | — | 20.6 | 43 | 11 |
| F-2 | X-11 | 2 | 0.1 | 0.16 | — | — | 20.0 | 42 | 12 |
| F-2 | X-12 | 2 | 0.1 | 0.18 | — | — | 19.6 | 40 | 8 |
| F-2 | X-13 | 2 | 0.1 | 0.18 | — | — | 19.8 | 39 | 10 |
| F-2 | X-14 | 2 | 0.1 | 0.16 | — | — | 20.2 | 48 | 12 |
| F-2 | X-15 | 2 | 0.08 | 0.16 | — | — | 20.2 | 30 | 7 |
| F-2 | X-16 | 2 | 0.08 | 0.18 | — | — | 20.0 | 36 | 12 |
| F-2 | X-17 | 2 | 0.08 | 0.22 | — | — | 21.0 | 37 | 6 |
| F-2 | X-18 | 2 | 0.08 | 0.22 | — | — | 20.6 | 30 | 8 |
| F-2 | X-19 | 2 | 0.08 | 0.20 | — | — | 20.3 | 29 | 6 |
| F-2 | X-20 | 2 | 0.1 | 0.20 | — | — | 20.5 | 38 | 9 |
| F-2 | X-21 | 2 | 0.1 | 0.20 | — | — | 20.1 | 39 | 13 |
| F-2 | X-22 | 2 | 0.1 | 0.22 | — | — | 20.6 | 42 | 10 |
| F-2 | X-23 | 2 | 0.1 | 0.22 | — | — | 20.1 | 46 | 14 |
| F-2 | X-24 | 2 | 0.1 | 0.22 | — | — | 20.2 | 35 | 7 |
| F-2 | X-25 | 2 | 0.1 | 0.20 | — | — | 20.3 | 26 | 6 |
| F-2 | X-26 | 2 | 0.08 | 0.18 | — | — | 20.4 | 33 | 13 |
| F-2 | X-27 | 2 | 0.08 | 0.16 | — | — | 20.0 | 42 | 8 |
| F-2 | X-28 | 2 | 0.08 | 0.14 | — | — | 19.8 | 36 | 7 |
| F-2 | X-29 | 2 | 0.08 | 0.16 | — | — | 19.9 | 32 | 14 |
| F-2 | X-30 | 2 | 0.08 | 0.14 | — | — | 20.1 | 36 | 15 |
| F-2 | X-31 | 2 | 0.08 | 0.16 | — | — | 20.3 | 34 | 9 |
| F-2 | Y-1 | 2 | 0.1 | 0.20 | — | — | 21.0 | 100 | 254 |
| F-2 | Y-2 | 2 | 0.1 | 0.22 | — | — | 21.2 | 100 | 254 |
| F-2 | Y-3 | 2 | 0.1 | 0.22 | — | — | 20.8 | 100 | 254 |
| F-2 | Y-4 | 2 | 0.1 | 0.22 | — | — | 20.8 | 100 | 254 |
| F-2 | Y-5 | 2 | 0.08 | 0.16 | — | — | 20.6 | 100 | 254 |
| F-2 | Y-6 | 2 | 0.08 | 0.16 | — | — | 20.2 | 100 | 254 |
| F-2 | Y-7 | 2 | 0.08 | 0.16 | — | — | 20.6 | 100 | 254 |
| F-2 | Y-8 | 2 | 0.1 | 0.18 | — | — | 20.1 | 100 | 254 |
| F-2 | Y-9 | 2 | 0.1 | 0.18 | — | — | 20.2 | 100 | 254 |
| F-1 | X-1 | 2 | 0.1 | 0.22 | P-1 | 2 | 20.6 | 12 | 4 |
| F-1 | X-8 | 2 | 0.1 | 0.24 | P-1 | 2 | 20.5 | 14 | 2 |
| F-1 | X-10 | 2 | 0.1 | 0.26 | P-1 | 2 | 20.4 | 10 | 1 |
| F-1 | X-21 | 2 | 0.1 | 0.24 | P-1 | 2 | 20.1 | 12 | 2 |
| F-1 | X-26 | 2 | 0.1 | 0.24 | P-1 | 2 | 20.3 | 13 | 4 |
| F-1 | X-31 | 2 | 0.1 | 0.26 | P-1 | 2 | 20.4 | 9 | 3 |
| F-3 | X-2 | 2 | 0.1 | 0.22 | P-1 | 2 | 20.5 | 11 | 4 |
| F-4 | X-2 | 2 | 0.1 | 0.22 | P-1 | 2 | 20.1 | 10 | 6 |
| F-5 | X-2 | 2 | 0.1 | 0.18 | P-1 | 2 | 20.4 | 6 | 2 |
| F-6 | X-2 | 2 | 0.08 | 0.16 | P-1 | 2 | 20.6 | 12 | 1 |
| F-7 | X-2 | 2 | 0.1 | 0.14 | P-1 | 2 | 20.3 | 15 | 3 |
| F-8 | X-2 | 2 | 0.08 | 0.12 | P-1 | 2 | 19.8 | 13 | 4 |
| F-9 | X-2 | 2 | 0.08 | 0.12 | P-1 | 2 | 20.0 | 18 | 3 |
| F-10 | X-2 | 2 | 0.1 | 0.16 | P-1 | 2 | 20.4 | 16 | 2 |
| E-11 | X-2 | 2 | 0.1 | 0.16 | P-1 | 2 | 20.3 | 48 | 16 |
| F-11 | X-12 | 2 | 0.1 | 0.20 | P-1 | 2 | 20.3 | 62 | 14 |
| F-11 | X-18 | 2 | 0.1 | 0.18 | P-1 | 2 | 20.1 | 49 | 12 |
| F-11 | X-27 | 2 | 0.1 | 0.18 | P-1 | 2 | 20.5 | 55 | 15 |
| F-1 | — | — | 0.1 | 0.35 | P-1 | 10 | 21.2 | 100 | 254 |
| F-1 | — | — | 0.1 | 0.35 | P-1 | 15 | 22.0 | 100 | 83 |
| F-1 | — | — | 0.1 | 0.35 | P-1 | 17 | 23.0 | 62 | 16 |
| F-1 | — | — | 0.1 | 0.35 | P-1 | 20 | 23.5 | 10 | 0 |
| F-1 | — | — | 0.1 | 0.35 | P-2 | 6 | 22.8 | 100 | 254 |
| F-1 | — | — | 0.1 | 0.35 | P-2 | 10 | 23.0 | 44 | 20 |
| F-1 | — | — | 0.1 | 0.35 | P-3 | 16 | 24.5 | 2 | 0 |
| F-2 | Y-3 | 2 | 0.1 | 0.22 | P-1 | 2 | 20.4 | 100 | 254 |
| F-2 | Y-4 | 2 | 0.1 | 0.20 | P-1 | 2 | 20.2 | 100 | 254 |
| F-2 | Y-5 | 2 | 0.1 | 0.20 | P-1 | 2 | 20.0 | 100 | 254 |
| F-2 | Y-6 | 2 | 0.1 | 0.18 | P-1 | 2 | 20.4 | 100 | 254 |
| F-2 | Y-7 | 2 | 0.1 | 0.20 | P-1 | 2 | 20.6 | 100 | 254 |
| F-2 | X-3 | 0.05 | 0.1 | 0.26 | P-1 | 2 | 20.4 | 7 | 4 |
| F-2 | X-3 | 0.1 | 0.1 | 0.26 | P-1 | 2 | 19.8 | 6 | 2 |
| F-2 | X-3 | 0.5 | 0.1 | 0.24 | P-1 | 2 | 20.2 | 12 | 6 |
| F-2 | X-3 | 1.5 | 0.08 | 0.20 | P-1 | 2 | 20.2 | 14 | 1 |
| F-2 | X-3 | 2.5 | 0.08 | 0.20 | P-1 | 2 | 20.0 | 8 | 2 |
| F-2 | X-3 | 4.0 | 0.06 | 0.16 | P-1 | 2 | 20.3 | 9 | 2 |
| F-2 | X-3 | 6.0 | 0.04 | 0.12 | P-1 | 2 | 21.0 | 12 | 3 |
| F-2 | X-13 | 0.05 | 0.1 | 0.26 | P-1 | 2 | 20.2 | 11 | 4 |
| F-2 | X-13 | 0.1 | 0.1 | 0.26 | P-1 | 2 | 20.0 | 8 | 1 |
| F-2 | X-13 | 0.5 | 0.1 | 0.24 | P-1 | 2 | 20.3 | 13 | 2 |
| F-2 | X-13 | 1.5 | 0.1 | 0.20 | P-1 | 2 | 20.1 | 12 | 3 |
| F-2 | X-13 | 2.5 | 0.08 | 0.20 | P-1 | 2 | 19.8 | 14 | 6 |
| F-2 | X-13 | 4.0 | 0.06 | 0.16 | P-1 | 2 | 20.0 | 9 | 2 |
| F-2 | X-13 | 6.0 | 0.04 | 0.12 | P-1 | 2 | 21.1 | 100 | 240 |
| F-2 | Y-3 | 0.05 | 0.1 | 0.26 | P-1 | 2 | 20.6 | 100 | 254 |
| F-2 | Y-3 | 0.1 | 0.1 | 0.26 | P-1 | 2 | 20.4 | 100 | 254 |
| F-2 | Y-3 | 0.5 | 0.1 | 0.26 | P-1 | 2 | 20.3 | 100 | 254 |
| F-2 | Y-3 | 1.5 | 0.08 | 0.20 | P-1 | 2 | 20.5 | 100 | 254 |
| F-2 | Y-3 | 2.5 | 0.06 | 0.14 | P-1 | 2 | 21.0 | 100 | 226 |
| F-2 | Y-3 | 4.0 | 0.04 | 0.12 | P-1 | 2 | 21.1 | 100 | 254 |

Table 5-continued

| Polyether-polyol | Amine Compound No. | (part by wt.) | Dabco (part by wt.) | T-9 (part by wt.) | Phosphorus-Containing Compound No. | (part by wt.) | Foam Density (kg/m³) | Burning Distance (mm) ASTM 1692-68 | MVSS 302 |
|---|---|---|---|---|---|---|---|---|---|
| F-2 | Y-3 | 6.0 | 0.03 | 0.10 | P-1 | 2 | 21.2 | 100 | 254 |

As is clear from the results shown in Table 5, when the phosphorus-containing compound was used together with the polyetherpolyols F-2 to F-10 containing a polyoxyethylene chain, the polyurethane foams prepared using the amine compound X-1 to X-31, respectively, of this invention showed a burning distance of 6 to 14 mm in ASTM D1692 and 1 to 6 mm in MVSS 302 and further the polyurethane foams prepared employing the same procedure without using, however, the flame retarder showed a burning distance of 28 to 45 mm in ASTM D1692-68 and 5 to 12 mm in MVSS 302. On the other hand, the polyurethane foams prepared using comparison compounds Y-1 to Y-9, respectively, showed a burning distance of 100 mm in ASTM D1692-68 and 284 mm in MVSS 302 both using the phosphorus-containing compound and of without using the phosphorus-containg compound. That is, the results showed that the addition of the amine compounds used in this invention gave good flame resisting effects.

In addition, in order to obtain good flame resisting effects without using the amine compound of this invention, it was necessary to use about 15 to 20 parts by weight of the phosphorus-containing compound. Also, when a polyetherpolyol which did not have a polyoxyethylene chain was used, the polyurethane foam prepared showed a self-extinguishing property in the test methods of ASTM D1692-68 and MVSS 302 although the effect was somewhat inferior to the use of a polyetherpolyol having a polyoxyethylene chain.

EXAMPLE 2

Soft polyurethane foams were prepared using two kinds of amine compounds previously described, the polyetherpolyols, and silicone oils also previously described. The compositions of the foaming materials, the foaming procedure, and the burning flame test empolyed in this example were as follows:

| Composition | | |
|---|---|---|
| Polyetherpolyol[1] | 100 | parts by weight |
| Water | 4.5 | parts by weight |
| Freon 11 | 7 | parts by weight |
| Silicone Oil[1] | 1.2 | parts by weight |
| Dabco | 0.1 | parts by weight |
| T-9 | 0.22 | parts by weight |
| N-Ethylmorpholine | 0.3 | parts by weight |
| Phosphorus-Containing Compound[1] | variable | |
| Amine Compound[1] | variable | |
| Tolylene Diisocyanate | 108 (index) | |

[1]As shown in Table 6.

Foaming Procedure

Same as in Example 1.

Flame Test

Same as in Example 1.

Flame Test Results

The test results obtained are shown in Table 6. As shown in the table, the effect of the combination of the silicone oils was best with silicone oils S-3, S-7, S-11, S-13, and S-14 followed by silicone oils S-2, S-4, S-6, S-8, S-10, S-12, and S-15. On the other hand, when silicone oils S-1, S-5, And S-9 and commerically available silicone oils L-520, L-540, F-220, and F-237, each of which having a molecular weight for the polyalklsiloxane hydrophobic group portion outside the range of 2000-5000, were used, the flame resisting effects obtained was not as large. Also, it was confirmed that comparison compounds Y gave inferior flame resisting effects even when they were used together with the most preferable kinds of silicone oils.

Table 6

| Polyether-polyol | Amine Compound No. | (part by wt.) | Silicone Oil No. or Trade Mark | Phosphorus-Containing Compound No. | (part by wt.) | Foam Density (kg/m³) | Burning Distance (mm) ASTM 1692-68 | MVSS 302 |
|---|---|---|---|---|---|---|---|---|
| F-1 | X-4 | 3 | S-1 | — | — | 20.5 | 78 | 50 |
| F-1 | X-4 | 3 | S-2 | — | — | 20.2 | 45 | 18 |
| F-1 | X-4 | 3 | S-3 | — | — | 20.4 | 25 | 12 |
| F-1 | X-4 | 3 | S-4 | — | — | 20.1 | 56 | 24 |
| F-1 | X-4 | 3 | S-5 | — | — | 20.4 | 94 | 48 |
| F-1 | X-4 | 3 | S-6 | — | — | 20.3 | 60 | 23 |
| F-1 | X-4 | 3 | S-7 | — | — | 20.2 | 28 | 14 |
| F-1 | X-4 | 3 | S-8 | — | — | 19.8 | 48 | 19 |
| F-1 | X-4 | 3 | S-9 | — | — | 20.6 | 90 | 53 |
| F-1 | X-4 | 3 | S-10 | — | — | 20.6 | 58 | 18 |
| F-1 | X-4 | 3 | S-11 | — | — | 20.0 | 33 | 10 |
| F-1 | X-4 | 3 | S-12 | — | — | 20.1 | 62 | 24 |
| F-1 | X-4 | 3 | S-13 | — | — | 20.3 | 36 | 16 |
| F-1 | X-4 | 3 | S-14 | — | — | 19.8 | 35 | 12 |
| F-1 | X-4 | 3 | S-15 | — | — | 20.5 | 88 | 46 |
| F-1 | X-4 | 3 | L-520 | — | — | 20.3 | 78 | 42 |
| F-1 | X-4 | 3 | L-540 | — | — | 20.1 | 79 | 57 |
| F-1 | X-4 | 3 | F-220 | — | — | 20.4 | 94 | 54 |
| F-1 | X-4 | 3 | F-237 | — | — | 19.9 | 92 | 52 |
| F-8 | X-4 | 3 | S-1 | — | — | 19.8 | 49 | 22 |
| F-8 | X-4 | 3 | S-2 | — | — | 19.8 | 40 | 13 |
| F-8 | X-4 | 3 | S-3 | — | — | 20.2 | 7 | 2 |
| F-8 | X-4 | 3 | S-4 | — | — | 20.6 | 38 | 11 |
| F-8 | X-4 | 3 | S-5 | — | — | 20.3 | 55 | 23 |
| F-8 | X-4 | 3 | S-6 | — | — | 20.5 | 36 | 15 |

Table 6-continued

| Polyether-polyol | Amine Compound No. | (part by wt.) | Silicone Oil No. or Trade Mark | Phosphorus-Containing Compound No. | (part by wt.) | Foam Density (kg/m³) | Burning Distance (mm) ASTM 1692-68 | MVSS 302 |
|---|---|---|---|---|---|---|---|---|
| F-8 | X-4 | 3 | S-7 | — | — | 20.4 | 8 | 1 |
| F-8 | X-4 | 3 | S-8 | — | — | 20.0 | 34 | 12 |
| F-8 | X-4 | 3 | S-9 | — | — | 19.8 | 49 | 26 |
| F-8 | X-4 | 3 | S-10 | — | — | 19.9 | 38 | 14 |
| F-8 | X-4 | 3 | S-11 | — | — | 19.8 | 8 | 3 |
| F-8 | X-4 | 3 | S-12 | — | — | 20.0 | 30 | 13 |
| F-8 | X-4 | 3 | S-13 | — | — | 20.3 | 10 | 4 |
| F-8 | X-4 | 3 | S-14 | — | — | 20.3 | 12 | 4 |
| F-8 | X-4 | 3 | S-15 | — | — | 20.1 | 55 | 26 |
| F-8 | X-4 | 3 | L-520 | — | — | 20.0 | 50 | 21 |
| F-8 | X-4 | 3 | L-540 | — | — | 20.1 | 62 | 25 |
| F-8 | X-4 | 3 | F-220 | — | — | 20.3 | 63 | 21 |
| F-8 | X-4 | 3 | F-237 | — | — | 20.1 | 49 | 30 |
| F-8 | X-12 | 2 | L-540 | P-1 | 2 | 20.3 | 33 | 8 |
| F-8 | X-16 | 2 | S-1 | P-1 | 2 | 20.1 | 31 | 12 |
| F-8 | X-21 | 2 | S-2 | P-1 | 2 | 20.4 | 8 | 1 |
| F-8 | X-23 | 2 | S-3 | P-1 | 2 | 19.9 | 2 | 0 |
| F-8 | X-25 | 2 | S-4 | P-1 | 2 | 19.8 | 12 | 2 |
| F-8 | X-28 | 2 | S-5 | P-1 | 2 | 19.8 | 36 | 14 |
| F-8 | Y-1 | 2 | S-3 | P-1 | 2 | 20.2 | 100 | 254 |
| F-8 | Y-2 | 2 | S-3 | P-1 | 2 | 20.6 | 100 | 254 |
| F-8 | Y-3 | 2 | S-3 | P-1 | 2 | 20.2 | 100 | 254 |
| F-8 | Y-4 | 2 | S-3 | P-1 | 2 | 20.4 | 100 | 254 |
| F-8 | Y-5 | 2 | S-3 | P-1 | 2 | 20.1 | 100 | 254 |
| F-8 | Y-6 | 2 | S-3 | P-1 | 2 | 20.6 | 100 | 254 |
| F-8 | Y-7 | 2 | S-3 | P-1 | 2 | 20.0 | 100 | 254 |
| F-8 | Y-8 | 2 | S-3 | P-1 | 2 | 19.9 | 100 | 254 |
| F-8 | Y-9 | 2 | S-3 | P-1 | 2 | 20.3 | 100 | 254 |

EXAMPLE 3

Soft polyurethane foams were prepared using the amine compounds and the polyetherpolyols previously described. The composition of the foaming mixtures, the foaming procedures, and the flame resistance test employed in this example were as follows:

| Composition | | |
|---|---|---|
| Polyetherpolyol[1] | 100 | parts by weight |
| Water | 4.7 | parts by weight |
| Freon 11 | 5 | parts by weight |
| Silicone Oil F-220 | 1.0 | parts by weight |
| Dabco | 0.1 | parts by weight |
| T-9 | 0.20 | parts by weight |
| N-Ethylmorpholine | 0.3 | parts by weight |
| Phosphorus-Containing Compound[1] | Variable | |
| Amine Compound[1] | variable | |
| Tolylene Diisocyanate-80 | 104 (index) | |

[1]As shown in Table 7.

Foaming Procedure and Burning Test

Same as in Example 1.

Flame Test Result

The results obtained are shown in Table 7. That is, as shown in Table 7, the polyurethane foams prepared showed sufficient flame resisting effect in the MVSS 302 test in the case of using the combination of two kinds of the amine compounds of this invention without using a phosphorus-containing compound. Furthermore, as is clear from the latter comparisons of this example, when a phosphorus-containing compound was used, the polyurethane foams prepared showed sufficient flame resisting effects even in the ASTM D1692-68 test which was a more severe flame test. Furthermore, it was confirmed that the flame resisting effects of te polyurethane foam depended upon the kind of amine compounds combined. For example, better results were obtained when a combination of Compounds VI and II and a combination of Compounds II and VII were used.

Table 7

| Polyether-polyol | Amine Compound No. | (part by wt.) | Amine Compound No. | (part by wt.) | Phosphorus-Containing Compound No. | (part by wt.) | Foam Density (kg/m³) | Burning Distance (mm) ASTM 1692-68 | MVSS 302 |
|---|---|---|---|---|---|---|---|---|---|
| F-1 | X-1 | 1 | X-11 | 1 | — | — | 17.6 | 7 | 2 |
| F-1 | X-1 | 1 | X-12 | 1 | — | — | 17.4 | 6 | 0 |
| F-1 | X-1 | 1 | X-13 | 1 | — | — | 17.8 | 12 | 0 |
| F-1 | X-2 | 1 | X-14 | 1 | — | — | 18.0 | 8 | 1 |
| F-1 | X-2 | 1 | X-15 | 1 | — | — | 17.6 | 6 | 2 |
| F-1 | X-2 | 1 | X-16 | 1 | — | — | 17.8 | 8 | 0 |
| F-1 | X-1 | 1 | X-20 | 1 | — | — | 17.9 | 7 | 0 |
| F-1 | X-1 | 1 | X-21 | 1 | — | — | 17.9 | 11 | 1 |
| F-1 | X-1 | 1 | X-22 | 1 | — | — | 18.1 | 12 | 0 |
| F-1 | X-2 | 1 | X-23 | 1 | — | — | 18.2 | 9 | 0 |
| F-1 | X-2 | 1 | X-24 | 1 | — | — | 18.0 | 12 | 2 |
| F-1 | X-11 | 1 | X-27 | 1 | — | — | 17.9 | 4 | 0 |
| F-1 | X-11 | 1 | X-28 | 1 | — | — | 18.0 | 7 | 0 |
| F-1 | X-11 | 1 | X-29 | 1 | — | — | 18.3 | 7 | 1 |
| F-1 | X-12 | 1 | X-30 | 1 | — | — | 18.1 | 9 | 0 |
| F-1 | X-12 | 1 | X-31 | 1 | — | — | 18.0 | 10 | 1 |
| F-1 | X-13 | 1 | X-31 | 1 | — | — | 17.9 | 12 | 0 |
| F-1 | X-1 | 1 | X-25 | 1 | — | — | 18.2 | 42 | 7 |

Table 7-continued

| Polyether-polyol | Amine Compound No. | (part by wt.) | Amine Compound No. | (part by wt.) | Phosphorus-Containing Compound No. | (part by wt.) | Foam Density (kg/m³) | Burning Distance (mm) ASTM 1692-68 | MVSS 302 |
|---|---|---|---|---|---|---|---|---|---|
| F-1 | X-1 | 1 | X-26 | 1 | — | — | 18.4 | 40 | 6 |
| F-1 | X-1 | 1 | X-27 | 1 | — | — | 18.0 | 46 | 8 |
| F-1 | X-3 | 1 | X-28 | 1 | — | — | 17.9 | 38 | 8 |
| F-1 | X-3 | 1 | X-29 | 1 | — | — | 17.9 | 29 | 9 |
| F-1 | X-3 | 1 | X-30 | 1 | — | — | 18.2 | 36 | 12 |
| F-1 | X-20 | 1 | X-25 | 1 | — | — | 18.1 | 29 | 11 |
| F-1 | X-20 | 1 | X-26 | 1 | — | — | 18.6 | 41 | 7 |
| F-1 | X-20 | 1 | X-27 | 1 | — | — | 18.2 | 36 | 5 |
| F-1 | X-22 | 1 | X-28 | 1 | — | — | 18.3 | 40 | 8 |
| F-1 | X-22 | 1 | X-29 | 1 | — | — | 18.0 | 26 | 10 |
| F-1 | X-22 | 1 | X-30 | 1 | — | — | 18.3 | 35 | 12 |
| F-1 | X-11 | 1 | X-21 | 1 | — | — | 18.0 | 62 | 25 |
| F-1 | X-11 | 1 | X-21 | 1 | — | — | 18.1 | 68 | 24 |
| F-1 | X-13 | 1 | X-23 | 1 | — | — | 18.2 | 58 | 21 |
| F-1 | X-13 | 1 | X-23 | 1 | — | — | 18.2 | 48 | 26 |
| F-1 | X-15 | 1 | X-24 | 1 | — | — | 17.8 | 55 | 18 |
| F-1 | X-15 | 1 | X-24 | 1 | — | — | 17.9 | 60 | 17 |
| F-2 | X-1 | 1 | X-11 | 1 | — | — | 18.5 | 7 | 0 |
| F-2 | X-1 | 1 | X-20 | 1 | — | — | 17.8 | 8 | 0 |
| F-2 | X-12 | 1 | X-26 | 1 | — | — | 18.4 | 10 | 0 |
| F-2 | X-4 | 1 | X-27 | 1 | — | — | 17.9 | 28 | 8 |
| F-2 | X-23 | 1 | X-28 | 1 | — | — | 18.0 | 29 | 10 |
| F-2 | X-16 | 1 | X-24 | 1 | — | — | 17.9 | 62 | 31 |
| F-1 | X-3 | 1 | X-13 | 1 | P-1 | 3 | 18.1 | 0 | 0 |
| F-1 | X-3 | 1 | X-14 | 1 | P-1 | 3 | 18.2 | 2 | 0 |
| F-1 | X-4 | 1 | X-15 | 1 | P-1 | 3 | 18.0 | 1 | 0 |
| F-1 | X-4 | 1 | X-16 | 1 | P-1 | 3 | 18.2 | 2 | 0 |
| F-1 | X-3 | 1 | X-20 | 1 | P-1 | 3 | 18.1 | 3 | 0 |
| F-1 | X-3 | 1 | X-21 | 1 | P-1 | 3 | 18.0 | 0 | 0 |
| F-1 | X-5 | 1 | X-22 | 1 | P-1 | 3 | 17.9 | 0 | 0 |
| F-1 | X-5 | 1 | X-23 | 1 | P-1 | 3 | 18.5 | 2 | 0 |
| F-1 | X-13 | 1 | X-28 | 1 | P-1 | 3 | 18.2 | 2 | 0 |
| F-1 | X-13 | 1 | X-29 | 1 | P-1 | 3 | 18.1 | 1 | 0 |
| F-1 | X-15 | 1 | X-30 | 1 | P-1 | 3 | 18.0 | 0 | 0 |
| F-1 | X-3 | 1 | X-29 | 1 | P-1 | 3 | 18.0 | 7 | 0 |
| F-1 | X-6 | 1 | X-30 | 1 | P-1 | 3 | 18.1 | 12 | 0 |
| F-1 | X-8 | 1 | X-31 | 1 | P-1 | 3 | 18.0 | 8 | 0 |
| F-1 | X-20 | 1 | X-29 | 1 | P-1 | 3 | 18.2 | 6 | 0 |
| F-1 | X-20 | 1 | X-30 | 1 | P-1 | 3 | 18.0 | 11 | 0 |
| F-1 | X-21 | 1 | X-31 | 1 | P-1 | 3 | 17.9 | 13 | 1 |
| F-1 | X-12 | 1 | X-22 | 1 | P-1 | 3 | 18.2 | 32 | 7 |
| F-1 | X-13 | 1 | X-23 | 1 | P-1 | 3 | 18.0 | 28 | 6 |
| F-1 | X-14 | 1 | X-24 | 1 | P-1 | 3 | 18.1 | 26 | 10 |
| F-1 | X-10 | 1 | X-18 | 1 | P-2 | 3 | 18.0 | 0 | 0 |
| F-1 | X-10 | 1 | X-18 | 1 | P-2 | 3 | 18.2 | 0 | 0 |

EXAMPLE 4

Soft polyurethane foams were prepared using the polyetherpolyols, the silicone oils, the amine compounds, and the phosphorus-containing compounds as previously described. The compositions of the foaming mixtures, the foaming procedure, and the flame test results were as follows:

| Composition | |
|---|---|
| Polyetherpolyol[1] | 100 parts by weight |
| Water | 3.5 parts by weight |
| Freon 11 | 2.0 parts by weight |
| Silicone Oil L-520 | 1.5 parts by weight |
| Dabco | 0.1 parts by weight |
| T-9 | 0.35 parts by weight |
| N-ethylmorpholine | 0.5 parts by weight |
| Phosphorus-Containing Compound[1] | variable |
| Amine Compound[1] | variable |
| Desmodur T-65[2] | 100 (index) |

[1]As shown in tables 8 and 9.
[2]Trade name of tolylene diisocyanate, produced by Farbenfabriken Bayer A.G.

Foaming procedure and flame test procedure were the same as in Example 1.

Flame Test Result

The results obtained are shown in Table 8 and Table 9. That is, the results obtained where no phosphorus-containing compound was used are shown in Table 8 and the results obtained using phosphorus-containing compound P-1 are shown in Table 9.

As shown in Table 8, when the combination of three kinds of amine compounds of this invention was used, sufficient flame resisting effects with not only the MVSS 302 test but also the ASTM D1692-68 test were obtained without using the phosphorus-containing compound and further it was also confirmed that the use of the combination of three kinds of the amine compounds of this invention gave far more excellent flame resisting effects as compared with the cases of using the amine compound individually and a combination of the two kinds of amine compounds.

Furthermore, as shown in Table 9, when three kinds of the amine compounds of this invention were used together with the phosphorus-containing compound, the polyurethane foams prepared was self-extinguished before the flame reached the second marked line.

Table 8

| Polyether-polyol No. | Amine Compound No. | (part by wt.) | Amine Compound No. | (part by wt.) | Amine Compound No. | (part by wt.) | Foam Density (kg/m³) | Burning Distance (mm) ASTM 1692-68 | MVSS 302 |
|---|---|---|---|---|---|---|---|---|---|
| F-1 | X-6 | 1 | X-16 | 1 | X-20 | 1 | 26.2 | 3 | 0 |

Table 8-continued

| Polyether-polyol No. | Amine Compound No. | (part by wt.) | Amine Compound No. | (part by wt.) | Amine Compound No. | (part by wt.) | Foam Density (kg/m$^3$) | Burning Distance (mm) ASTM 1692-68 | MVSS 302 |
|---|---|---|---|---|---|---|---|---|---|
| F-2 | X-7 | 1 | X-17 | 1 | X-22 | 1 | 25.8 | 2 | 0 |
| F-3 | X-8 | 1 | X-18 | 1 | X-23 | 1 | 26.2 | 1 | 0 |
| F-1 | X-9 | 1 | X-19 | 1 | X-29 | 1 | 26.1 | 3 | 0 |
| F-2 | X-10 | 1 | X-11 | 1 | X-30 | 1 | 26.8 | 0 | 0 |
| F-3 | X-5 | 1 | X-12 | 1 | X-31 | 1 | 26.2 | 2 | 0 |
| F-1 | X-6 | 1 | X-20 | 1 | X-26 | 1 | 26.1 | 3 | 0 |
| F-2 | X-7 | 1 | X-21 | 1 | X-27 | 1 | 26.5 | 1 | 0 |
| F-3 | X-8 | 1 | X-22 | 1 | X-28 | 1 | 26.7 | 4 | 0 |
| F-1 | X-16 | 1 | X-23 | 1 | X-29 | 1 | 26.2 | 3 | 0 |
| F-2 | X-17 | 1 | X-24 | 1 | X-30 | 1 | 26.1 | 2 | 0 |
| F-3 | X-18 | 1 | X-20 | 1 | X-31 | 1 | 26.3 | 2 | 0 |

Table 9

| Polyether-polyol No. | Amine Compound No. | (part by wt.) | Amine Compound No. | (part by wt.) | Amine Compound No. | (part by wt.) | Phosphorus-Containing Compound No. | (part by wt.) | Foam Density (kg/m$^3$) | Burning Distance (mm) ASTM 1692-68 | MVSS 302 |
|---|---|---|---|---|---|---|---|---|---|---|---|
| F-1 | X-6 | 1 | X-16 | 1 | X-20 | 1 | P-1 | 2 | 26.3 | 0 | 0 |
| F-2 | X-7 | 1 | X-17 | 1 | X-22 | 1 | P-1 | 2 | 26.6 | 0 | 0 |
| F-3 | X-8 | 1 | X-18 | 1 | X-23 | 1 | P-1 | 2 | 26.7 | 0 | 0 |
| F-1 | X-9 | 1 | X-19 | 1 | X-29 | 1 | P-1 | 2 | 26.2 | 0 | 0 |
| F-2 | X-10 | 1 | X-11 | 1 | X-30 | 1 | P-1 | 2 | 26.0 | 0 | 0 |
| F-3 | X-5 | 1 | X-12 | 1 | X-31 | 1 | P-1 | 2 | 26.3 | 0 | 0 |
| F-1 | X-6 | 1 | X-20 | 1 | X-26 | 1 | P-1 | 2 | 26.2 | 0 | 0 |
| F-2 | X-7 | 1 | X-21 | 1 | X-27 | 1 | P-1 | 2 | 26.0 | 0 | 0 |
| F-3 | X-8 | 1 | X-22 | 1 | X-28 | 1 | P-1 | 2 | 26.4 | 0 | 0 |
| F-1 | X-16 | 1 | X-23 | 1 | X-29 | 1 | P-1 | 2 | 26.5 | 0 | 0 |
| F-2 | X-17 | 1 | x-24 | 1 | x-30 | 1 | P-1 | 2 | 26.1 | 0 | 0 |
| F-3 | X-18 | 1 | X-20 | 1 | X-31 | 1 | P-1 | 2 | 26.5 | 0 | 0 |

EXAMPLE 5

Soft polyurethane foams were prepared using the polyetherpolyols, the silicone oils, the amine compounds, and the phosphorus-containing compounds previously described. The composition of the foaming mixture, the foaming procedure, and the flame test results were as follows:

| Composition | |
|---|---|
| Polyetherpolyol F-2 | 100 parts by weight |
| Water | 4.2 parts by weight |
| Freon 11 | 10 parts by weight |
| Silicone Oil S-1 | 1.2 parts by weight |
| Dabco | 0.1 parts by weight |
| T-9 | 0.20 parts by weight |
| N-Ethylmorpholine | 0.3 parts by weight |
| Phosphorus-Containing Compound P-3 | variable |
| Amine Compound [1] | 2.0 parts by weight (total amount) |
| Desmodur T-65 | 105 (index) |

[1] As shown in Tables 10 and 11.

The foaming procedure and the flame test procedure employed were the same as in Example 1.

Flame Test Results

The results obtained using no phosphorus-containing compound are shown in Table 10 and the results obtained by using 2 parts by weight of compound P-3 as a phosphorus-containing compound are shown in Table 11. The densities of the foams prepared were 20.2 kg/m$^3$ at a maximum and 19.6 kg/m$^3$ at a minimum, which showed there was no particular difference between the maximum density and the minimum density in any of the cases.

Also, as shown in Table 10, it was confirmed that the use of four kinds of the amine compounds of this invention gave superior flame resisting effects to the case of using less than four kinds of the amine compounds. Furthermore, as shown in Table 11, when four kinds of the amine compounds of this invention were used together with the phosphorus-containing compound, the polyurethane foams thus prepared were all self-extinguished before the marked line, which showed that quite excellent results were obtained.

Table 10

| Amine Compound No. | (part by wt.) | Amine Compound No. | (part by wt.) | Amine Compound No. | (part by wt.) | Amine Compound No. | (part by wt.) | Burning Distance (mm) ASTM 1692-68 | MVSS 302 |
|---|---|---|---|---|---|---|---|---|---|
| X-1 | 0.5 | X-11 | 0.5 | X-20 | 0.5 | X-26 | 0.5 | 0 | 0 |
| X-2 | 0.5 | X-12 | 0.5 | X-21 | 0.5 | X-27 | 0.5 | 1 | 0 |
| X-3 | 0.5 | X-13 | 0.5 | X-22 | 0.5 | X-28 | 0.5 | 0 | 0 |
| X-4 | 0.5 | X-14 | 0.5 | X-23 | 0.5 | X-29 | 0.5 | 0 | 0 |
| X-5 | 0.5 | X-15 | 0.5 | X-24 | 0.5 | X-30 | 0.5 | 0 | 0 |

Table 11

| Amine Compound | | Amine Compound | | Amine Compound | | Amine Compound | | Phosphorus-Containing Compound | | Burning Distance(mm) | |
|---|---|---|---|---|---|---|---|---|---|---|---|
| No. | (part by wt.) | No. | (part by wt.) | No. | (part by wt.) | No. | (part by wt.) | No. | (part by wt.) | ASTM 1692-68 | MVSS 302 |
| X-1 | 0.5 | X-11 | 0.5 | X-20 | 0.5 | X-26 | 0.5 | P-3 | 2 | 0 | 0 |
| X-2 | 0.5 | X-12 | 0.5 | X-21 | 0.5 | X-27 | 0.5 | P-3 | 2 | 0 | 0 |
| X-3 | 0.5 | X-13 | 0.5 | X-22 | 0.5 | X-28 | 0.5 | P-3 | 2 | 0 | 0 |
| X-4 | 0.5 | X-14 | 0.5 | X-23 | 0.5 | X-29 | 0.5 | P-3 | 2 | 0 | 0 |
| X-5 | 0.5 | X-15 | 0.5 | X-24 | 0.5 | X-30 | 0.5 | P-3 | 2 | 0 | 0 |

EXAMPLE 6

Soft polyurethane foams were prepared using the polyetherpolyol, the silicone oils, the amine compounds, and the phosphorus-containing compound previously shown. The compositions of the foaming mixtures, the foaming procedure, and the flame test results were as follows:

| Composition | |
|---|---|
| Polyetherpolyol | 100 parts by weight |
| Water | 3.5 parts by weight |
| Freon 11 | 2 parts by weight |
| Silicone Oil[1] | 0.8 parts by weight |
| Dabco | 0.10 parts by weight |
| T-9 | 0.20 parts by weight |
| Dimethylethanolamine | 0.20 parts by weight |
| Amine Compound X-20 | 1.0 parts by weight |
| Amine Compound[1] Used Together with Amine Compound X-20 | variable |
| Tolylene Diisocyanate-80 | 105 (index) |

[1] As shown in Table 12.

Foaming Procedure and Flame Test Procedure

To the total amount of tolylene diisocyanate maintained at 80° C was added gradually 25 parts by weight (250g) of the polyetherpolyol with stirring and thereafter the mixture was maintained at a specific temperature for The 30 minutes and then cooled. The prepolymer thus formed was viscous transparent liquid. Using the prepolymer thus formed as a polyisocyanate and also 75 parts by weight (750g) of the polyetherpolyol, the same foaming procedure as in Example 1 was conducted. The test was also conducted as in Example 1.

Burning Test Results

The polyurethane foams obtained were excellent open cellular foams having a maximum density of 31.2 kg/m$^3$ and a minimum density of 30.2 kg/m$^3$. The results of the test are shown in Table 12. The results showed that the best burning resisting effects were obtained when silicone oils S-3, S-7, S-11, S-13, and S-14 were used, followed by silicone oils S-4 and S-2 and further by silicone oils S-1 and S-5.

Table 12

| Polyether-polyol No. | Amine Compound | | Amine Compound | | Silicone Oil No. | Burning Distance(mm) | |
|---|---|---|---|---|---|---|---|
| | No. | (part by wt.) | No. | (part by wt.) | | ASTM 1692-68 | MVSS 302 |
| F-1 | X-1 | 1.0 | — | — | S-1 | 7 | 0 |
| F-1 | X-11 | 1.0 | — | — | S-1 | 65 | 18 |
| F-1 | X-26 | 1.0 | — | — | S-1 | 26 | 12 |
| F-1 | X-1 | 1.0 | — | — | S-2 | 3 | 0 |
| F-1 | X-11 | 1.0 | — | — | S-2 | 32 | 10 |
| F-1 | X-26 | 1.0 | — | — | S-2 | 6 | 1 |
| F-1 | X-1 | 1.0 | — | — | S-3 | 0 | 0 |
| F-1 | X-11 | 1.0 | — | — | S-3 | 5 | 0 |
| F-1 | X-26 | 1.0 | — | — | S-3 | 2 | 0 |
| F-1 | X-1 | 1.0 | — | — | S-4 | 6 | 0 |
| F-1 | X-11 | 1.0 | — | — | S-4 | 30 | 12 |
| F-1 | X-26 | 1.0 | — | — | S-4 | 9 | 2 |
| F-1 | X-1 | 1.0 | — | — | S-5 | 7 | 1 |
| F-1 | X-11 | 1.0 | — | — | S-5 | 68 | 22 |
| F-1 | X-26 | 1.0 | — | — | S-5 | 31 | 16 |
| F-2 | X-1 | 1.0 | — | — | S-7 | 0 | 0 |
| F-2 | X-11 | 1.0 | — | — | S-7 | 2 | 0 |
| F-2 | X-26 | 1.0 | — | — | S-7 | 0 | 0 |
| F-2 | X-1 | 1.0 | — | — | S-11 | 0 | 0 |
| F-2 | X-11 | 1.0 | — | — | S-13 | 4 | 0 |
| F-2 | X-26 | 1.0 | — | — | S-14 | 0 | 0 |
| F-2 | X-1 | 1.0 | X-26 | 1.0 | S-7 | 0 | 0 |
| F-2 | X-1 | 1.0 | X-12 | 1.0 | S-13 | 0 | 0 |
| F-1 | X-1 | 1 | X-12 | 1 | S-1 | 8 | 4 |
| F-1 | X-1 | 1 | X-12 | 1 | S-2 | 5 | 2 |
| F-1 | X-1 | 1 | X-12 | 1 | S-3 | 3 | 0 |
| F-1 | X-1 | 1 | X-12 | 1 | S-4 | 6 | 2 |
| F-1 | X-1 | 1 | X-12 | 1 | S-5 | 10 | 6 |
| F-1 | X-2 | 1 | X-22 | 1 | S-1 | 9 | 3 |
| F-1 | X-2 | 1 | X-22 | 1 | S-2 | 6 | 1 |
| F-1 | X-2 | 1 | X-22 | 1 | S-3 | 2 | 0 |
| F-1 | X-2 | 1 | X-22 | 1 | S-4 | 4 | 3 |
| F-1 | X-22 | 1 | X-22 | 1 | S-5 | 10 | 6 |
| F-1 | X-13 | 1 | X-26 | 1 | S-1 | 10 | 2 |
| F-1 | X-4 | 1 | X-26 | 1 | S-1 | 34 | 13 |
| F-1 | X-23 | 1 | X-26 | 1 | S-1 | 28 | 14 |
| F-1 | X-12 | 1 | X-28 | 1 | S-1 | 53 | 22 |
| F-1 | X-4 | 1 | X-26 | 1 | S-3 | 18 | 8 |
| F-1 | X-23 | 1 | X-26 | 1 | S-3 | 12 | 11 |
| F-1 | X-12 | 1 | X-28 | 1 | S-3 | 10 | 14 |
| F-2 | X-4 | 1 | X-26 | 1 | S-1 | 43 | 10 |
| F-2 | X-23 | 1 | X-26 | 1 | S-1 | 44 | 11 |

2. The process as claimed in claim 1, said amine component further comprising
   (f) an amine compound selected from the group consisting of

[chemical structures]

Table 12-continued

| Polyether-polyol No. | Amine Compound No. | (part by wt.) | Amine Compound No. | (part by wt.) | Silicone Oil No. | Burning Distance(mm) ASTM 1692-68 | MVSS 302 |
|---|---|---|---|---|---|---|---|
| F-2 | X-12 | 1 | X-28 | 1 | S-1 | 52 | 18 |
| F-2 | X-4 | 1 | X-26 | 1 | S-3 | 28 | 6 |
| F-2 | X-23 | 1 | X-26 | 1 | S-3 | 33 | 7 |
| F-2 | X-12 | 1 | X-28 | 1 | S-3 | 36 | 11 |

EXAMPLE 7

Soft polyurethane foams were prepared using the polyesterpolyol shown below and the silicone oil, the amine compound, and the phsophorus-containing compound previously described. The compositions of the foaming mixtures, the foaming procedure, and the flame test results are as follows:

| Composition | | |
|---|---|---|
| Polesterpolyol[1] | 100 | parts by weight |
| Water | 3.5 | parts by weight |
| Freon 11 | 2.0 | parts by weight |
| Silicone Oil S-4 | 0.8 | parts by weight |
| Dabco | 0.10 | parts by weight |
| T-9 | 0.06 | parts by weight |
| Dimethylethanolamine | 0.20 | parts by weight |
| Amine Compound[2] | 2.0 (total) | parts by weight |
| Desmodur T-65 | 105 | (index) |

[1]Prepared from ethylene glycol and adipic acid. The hydroxyl value of the polyesterpolyol was 45.0.
[2]As shown in Table 13.

The foaming procedure and the flame test procedure were the same as in Example 1.

Flame Test Results

The foams obtained all had a good appearance and the foam densities were in the range of 25 to 25.9 kg/m$^3$, showing no particular difference in density.

The burning test results are shown in Table 13, which showed that the addition of the amine compounds of this invention improved the flame resistance in all cases.

and modifications can be made therein without departing from the spirit and scope thereof.

What is claimed is:

1. A process for producing a flame resistant soft polyurethane foam comprising reacting a mixture of
   (a) a polyetherpolyol or a polyesterpolyol, each having at least two active hydrogen atoms,
   (b) a polyisocyanate,
   (c) at least one foaming agent,
   (d) a catalyst and about 0.1 to 5 parts by weight of the polyetherpolyol or polyesterpolyol of an amine component comprising
   (e) an amine compound selected from the group consisting of

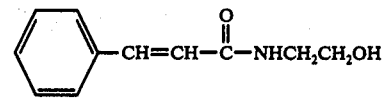

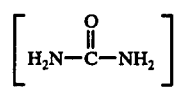

Table 13

| Amine Compound No. | (part by wt.) | Amine Compound No. | (part by wt.) | Amine Compound No. | (part by wt.) | Phosphorus-Containing Compound No. | (part by wt.) | Burning Distance (mm) ASTM 1692-68 | MVSS 302 |
|---|---|---|---|---|---|---|---|---|---|
| X-1 | 2 | — | — | — | — | — | — | 33 | 10 |
| X-4 | 2 | — | — | — | — | — | — | 36 | 11 |
| X-12 | 2 | — | — | — | — | — | — | 42 | 9 |
| X-18 | 2 | — | — | — | — | — | — | 32 | 13 |
| X-23 | 2 | — | — | — | — | — | — | 29 | 10 |
| X-28 | 2 | — | — | — | — | — | — | 30 | 9 |
| X-1 | 2 | — | — | — | — | P-1 | 2 | 6 | 2 |
| X-4 | 2 | — | — | — | — | P-1 | 2 | 8 | 2 |
| X-12 | 2 | — | — | — | — | P-1 | 2 | 10 | 4 |
| X-18 | 2 | — | — | — | — | P-1 | 2 | 9 | 2 |
| X-23 | 2 | — | — | — | — | P-1 | 2 | 12 | 1 |
| X-28 | 2 | — | — | — | — | P-1 | 2 | 8 | 3 |
| Y-1 | 2 | — | — | — | — | — | — | 100 | 254 |
| Y-2 | 2 | — | — | — | — | — | — | 100 | 254 |
| Y-3 | 2 | — | — | — | — | — | — | 100 | 254 |
| Y-4 | 2 | — | — | — | — | — | — | 100 | 254 |
| Y-8 | 2 | — | — | — | — | — | — | 100 | 254 |
| X-2 | 1 | X-13 | 1 | — | — | — | — | 7 | 2 |
| X-2 | 1 | X-22 | 1 | — | — | — | — | 6 | 0 |
| X-14 | 1 | X-29 | 1 | — | — | — | — | 8 | 2 |
| X-3 | 1 | X-30 | 1 | — | — | — | — | 33 | 10 |
| X-15 | 1 | X-31 | 1 | — | — | — | — | 56 | 22 |
| X-3 | 1 | X-21 | 0.5 | X-30 | 0.5 | — | — | 0 | 0 |

While the invention has been described in detail and with reference to specific embodiments thereof, it will be apparent to one skilled in the art that various changes

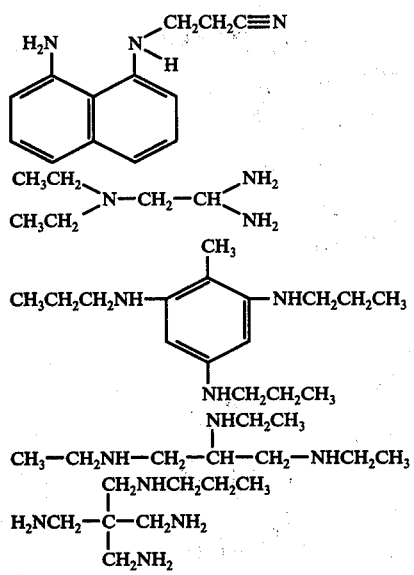
3. The process as claimed in claim 2, said amine component further comprising
   (a) an amine compound selected from the group consisting of
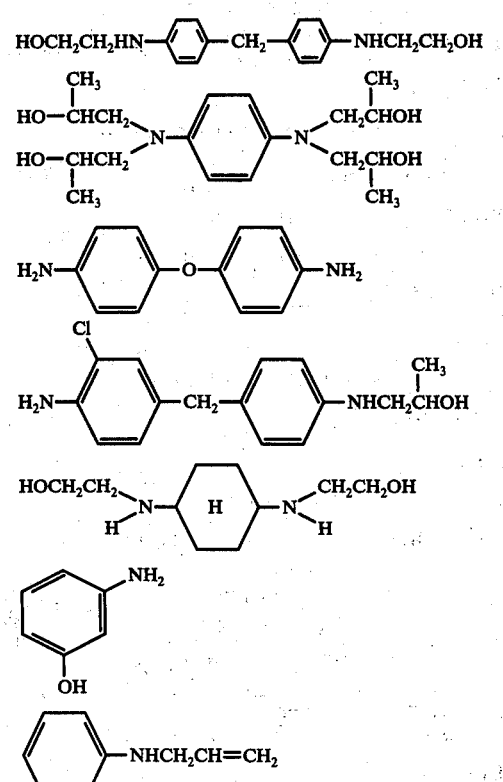
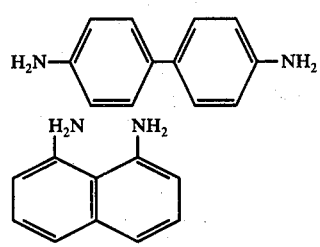
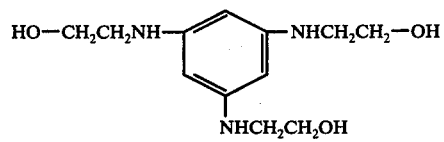
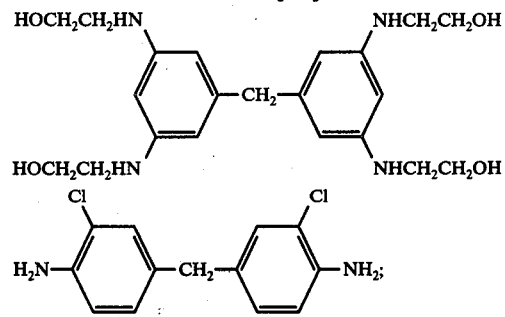
(h) an amine compound selected from the group consisting of
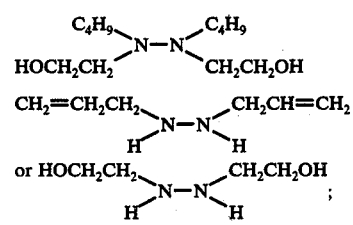
(i) an amine compound selected from the group consisting of
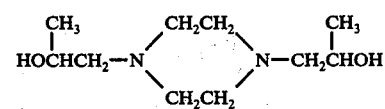
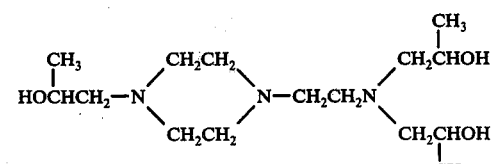
or
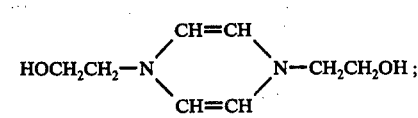
(j) an amine compound selected from the group consisting of

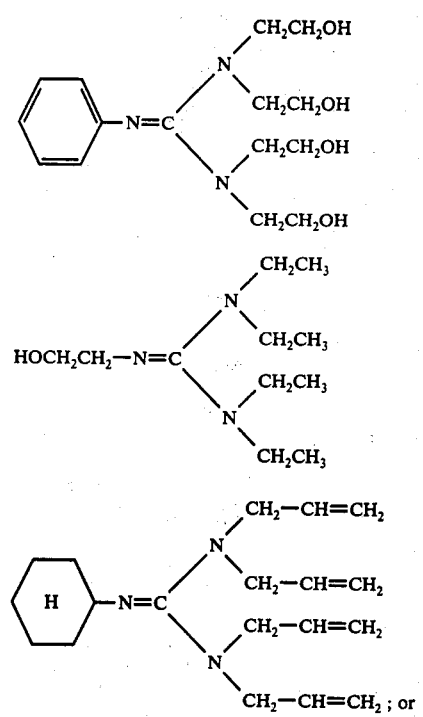
(k) an amine compound selected from the group consisting of
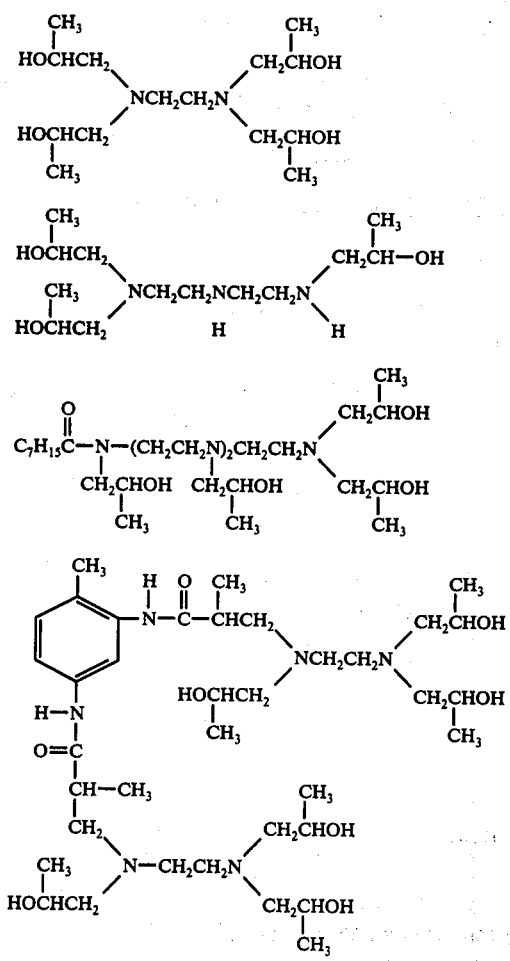
-continued
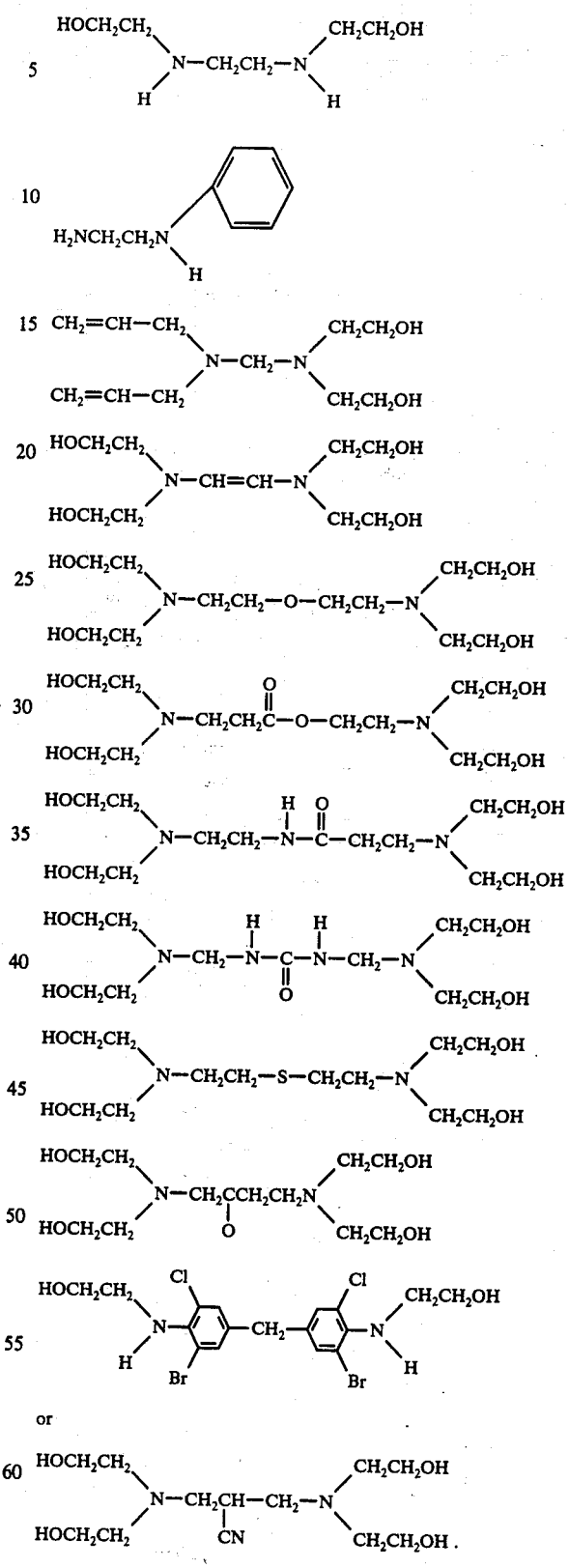
4. The process as claimed in claim 1, said amine component further comprising
(g) an amine compound selected from the group consisting of

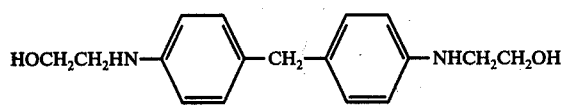
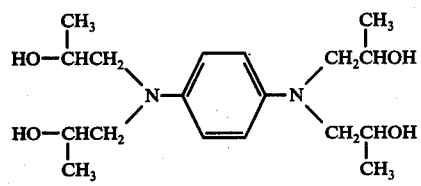
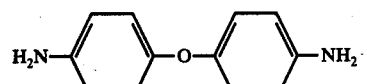
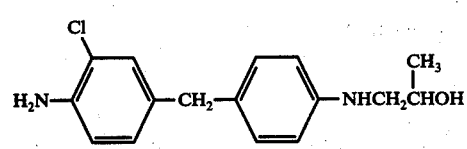
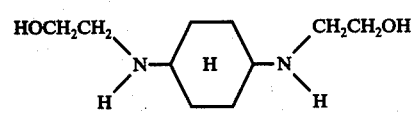
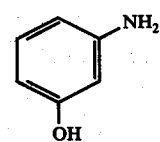
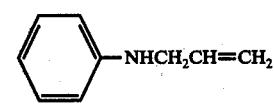
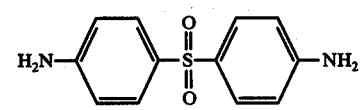
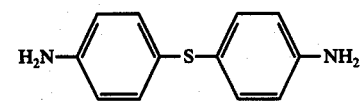
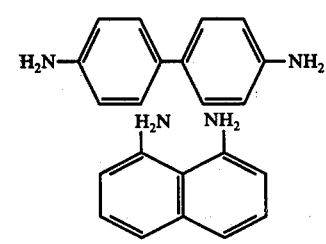
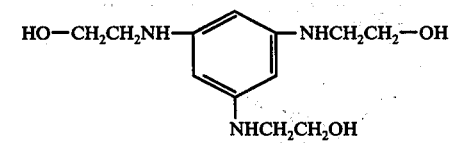
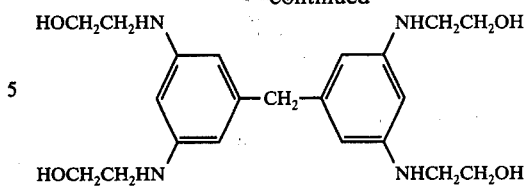
or
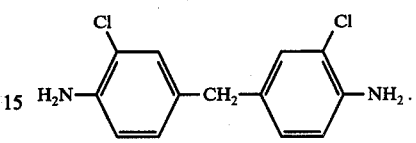
5. The process as claimed in claim 4, said amine component further comprising
(h) an amine compound selected from the group consisting of
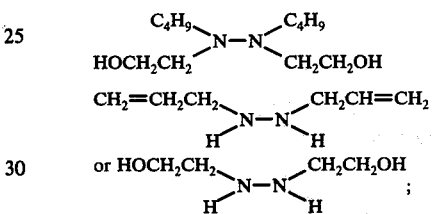
(i) an amine compound selected from the group consisting of
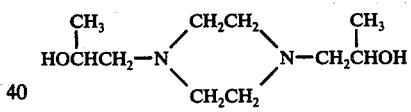
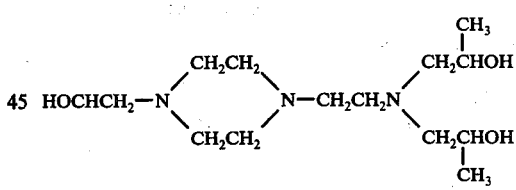
or
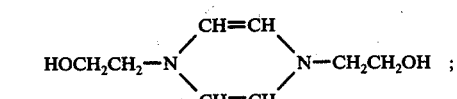
(j) an amine compound selected from the group consisting of
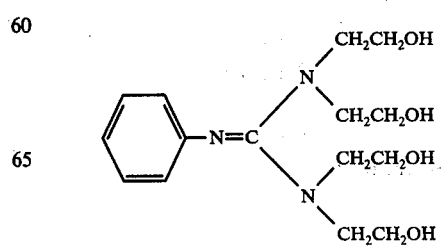

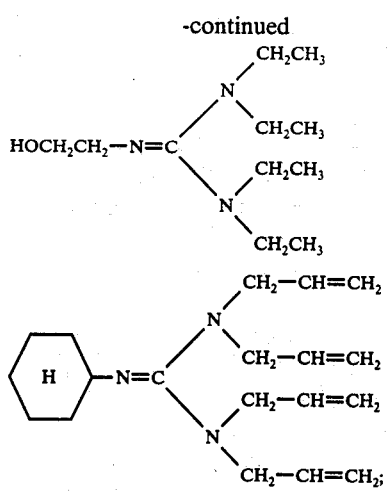
or
(k) an amine compound selected from the group consisting of
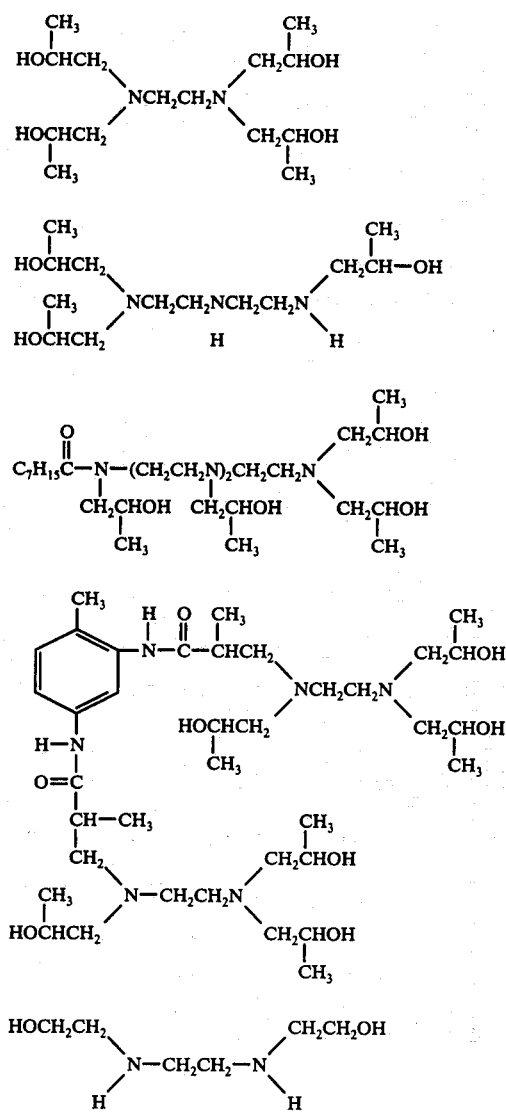
6. The process as claimed in claim 1, said amine component further comprising
(h) an amine compound selected from the group consisting of

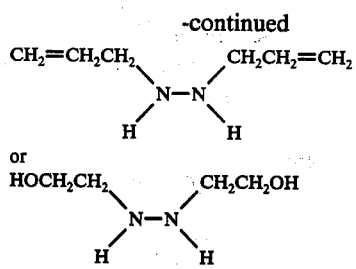
7. The process as claimed in claim 6, said amine component further comprising
(i) an amine compound selected from the group consisting of
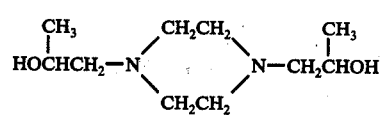
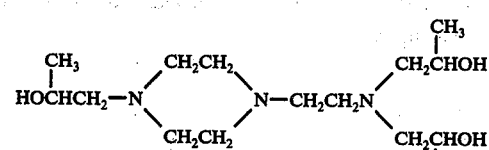
or
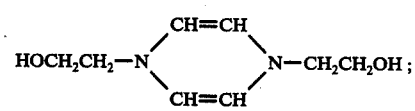
(j) an amine compound selected from the group consisting of
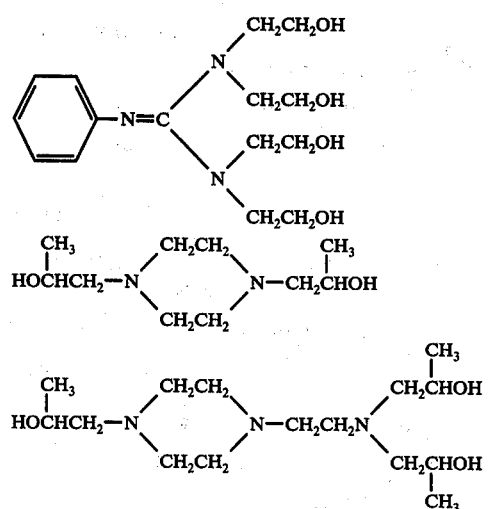
or
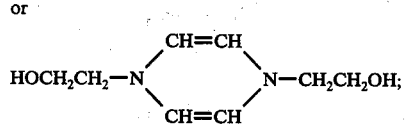
(k) an amine compound selected from the group consisting of
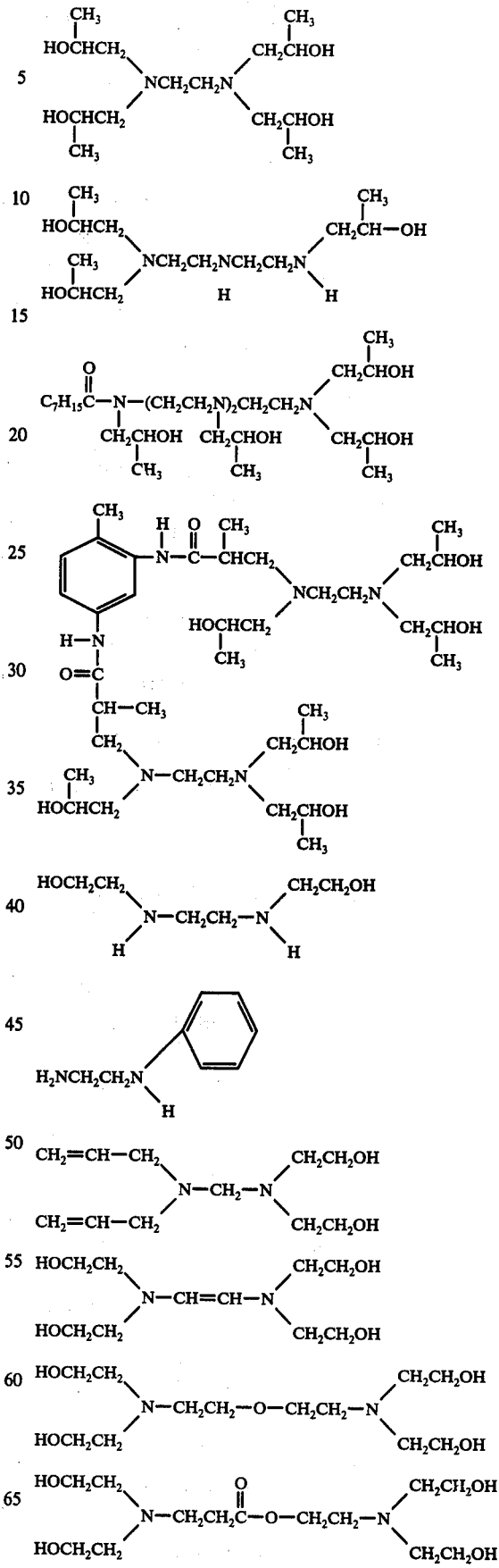

-continued
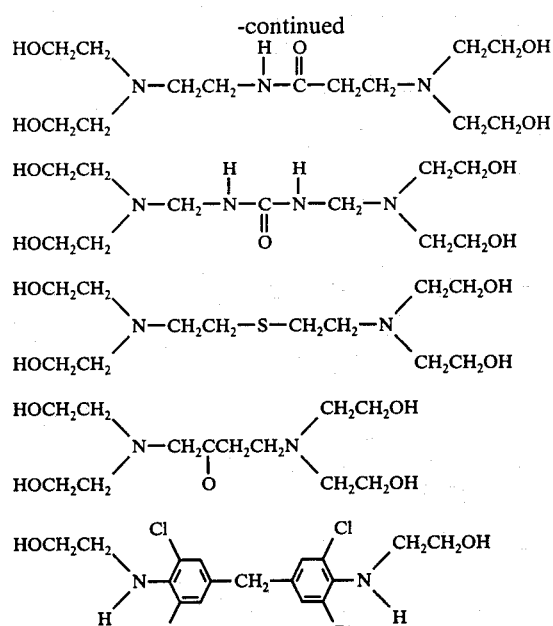
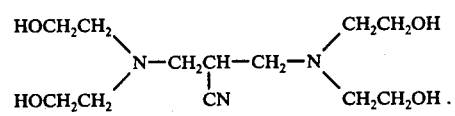
or
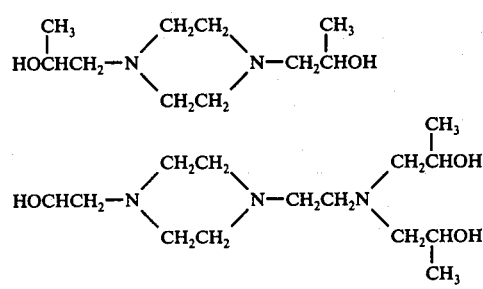
8. The process as claimed in claim 1, said amine component further comprising
(i) an amine compound selected from the group consisting of
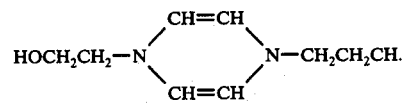
or
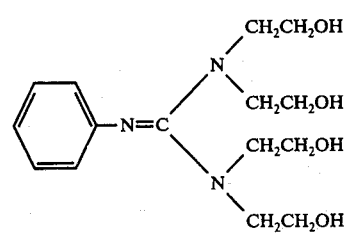
9. The process as claimed in claim 8, said amine component further comprising
(j) an amine compound selected from the group consisting of
-continued
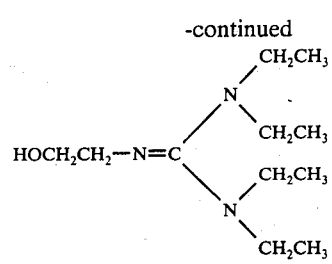
or
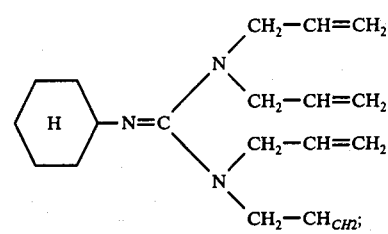
(k) an amine compound selected from the group consisting of
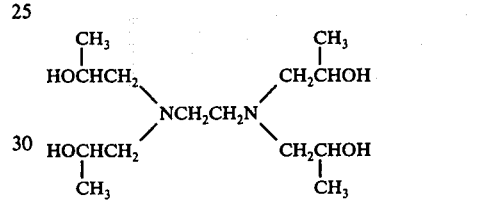
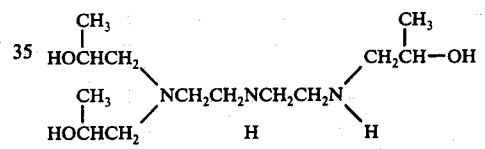
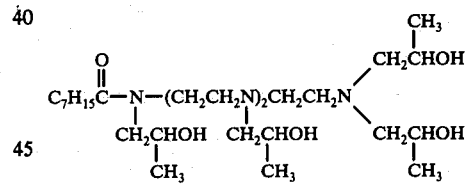
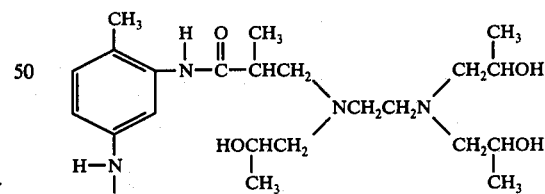
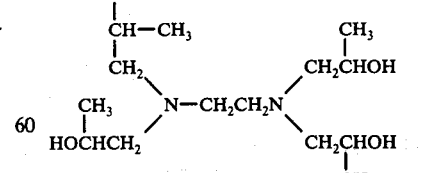
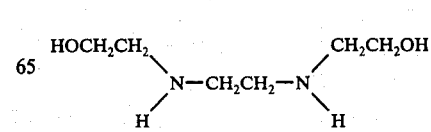

-continued
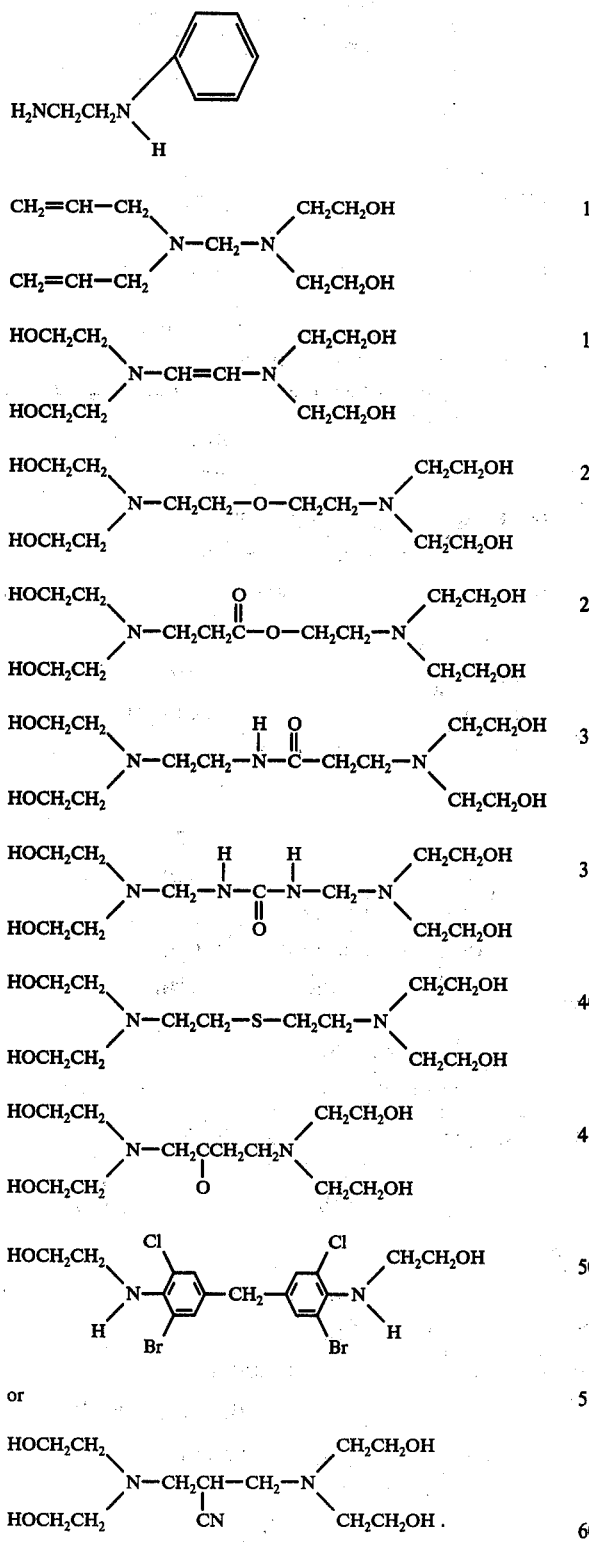
10. The process as claimed in claim 1, said amine component further comprising
(j) an amine compound selected from the group consisting of
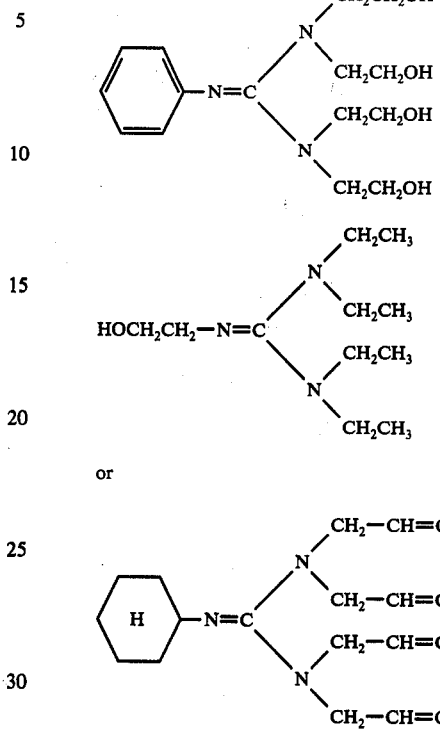
11. The process as claimed in claim 10, said amine component further comprising
(k) an amine compound selected from the group consisting of
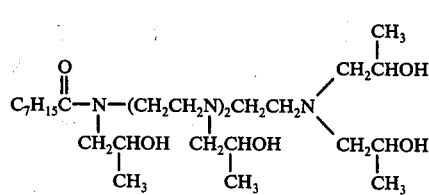

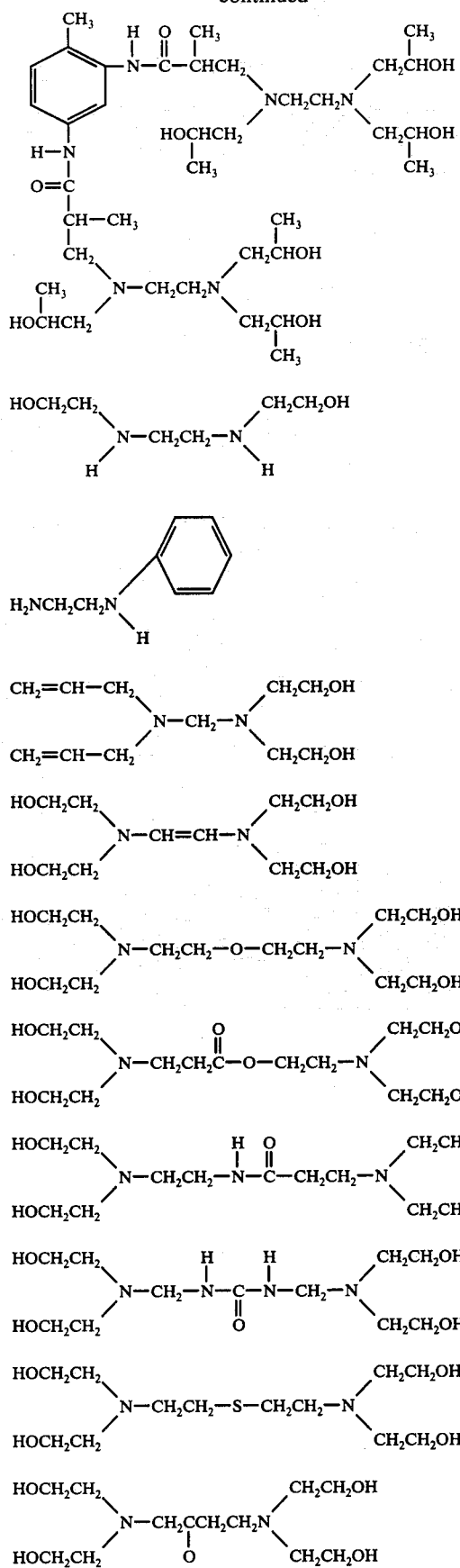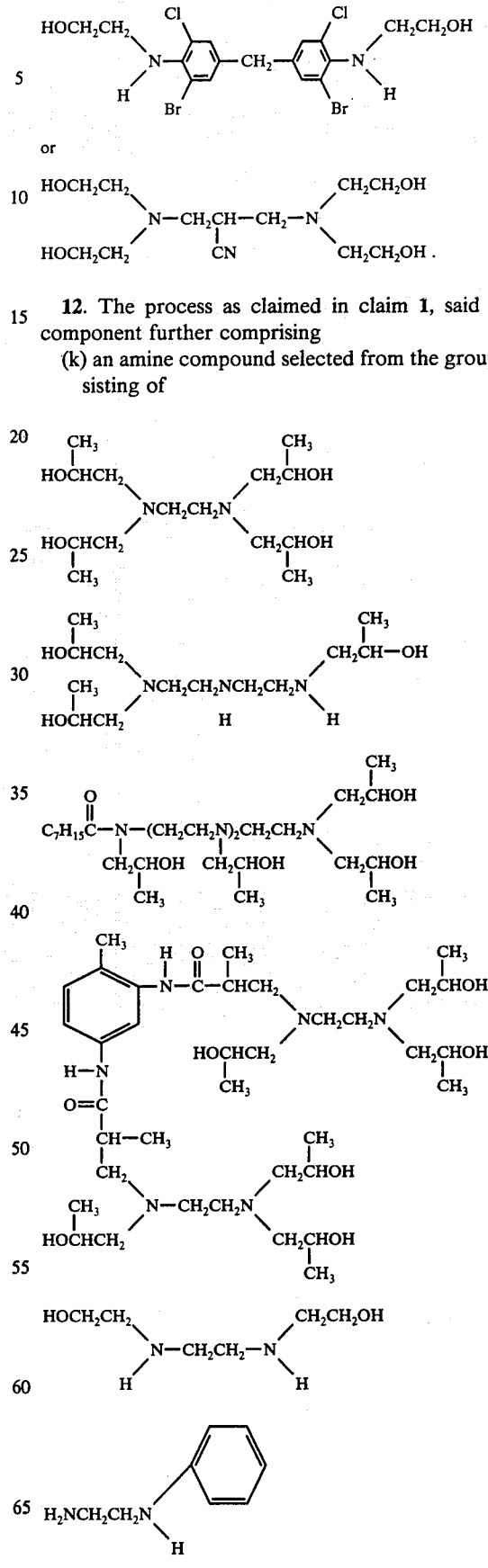
12. The process as claimed in claim 1, said amine component further comprising
(k) an amine compound selected from the group consisting of

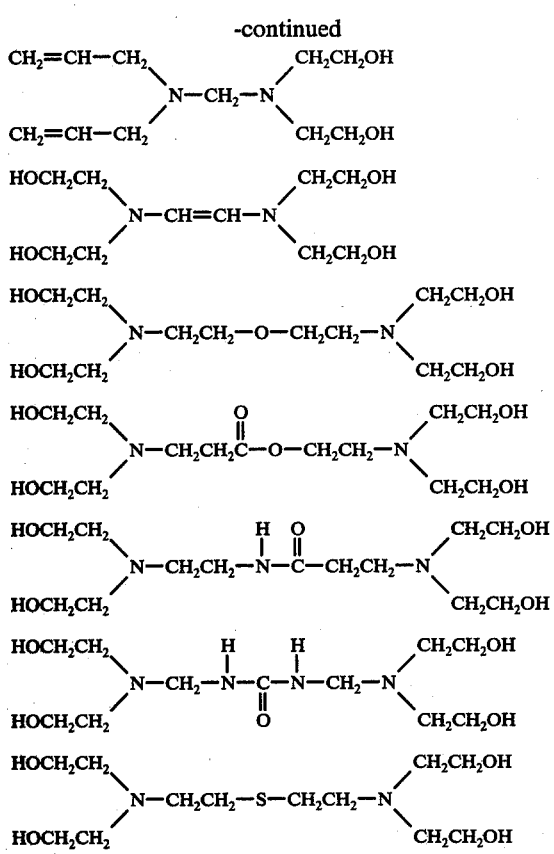

13. The process as claimed in claim 1, wherein said at least one volatile foaming agent (c) is water and is present in an amount of from about 0.5 to 6 parts by weight per 100 parts by weight of the polyetherpolyol of polyesterpolyol (a).

14. The process as claimed in claim 1, wherein said at least one foaming agent (c) is a volatile foaming agent other than water and is present in an amount of from about 2 to 70 parts by weight per 100 parts by weight of the polyetherpolyol or polyesterpolyol (a).

15. The process as claimed in claim 1, wherein said amount of the amine component is 0.3 to 3 parts by weight.

16. The process as claimed in claim 15, wherein said amount of the amine component is 0.5 to 2 parts by weight.

17. The process as in claim 1 wherein aid mixture further comprises a phosphorus containing compound.

18. The process as claimed in claim 17, wherein said phosphorus-containing compound is selected from the group consisting of tris-2,3-dibromopropyl phosphate, tris-chloroethyl phosphate, trisdichloropropyl phosphate, monodichloropropyl-bis-(dibromopropyl)phosphate and triphenyl phosphate.

19. The process as claimed in claim 17, wherein the amount of said phosphorus-containing compound is less than 0.5% by weight based on the weight of said soft polyurethane foam.

20. The process as claimed in claim 1, said mixture further comprising a silicone oil.

21. The process as claimed in claim 20, wherein the polyalkylsiloxane hydrophobic moiety of said silicone oil has a molecular weight ranging from about 2,000 to 5,000.

22. The process as claimed in claim 20, wherein said silicone oil is represented by the general formula

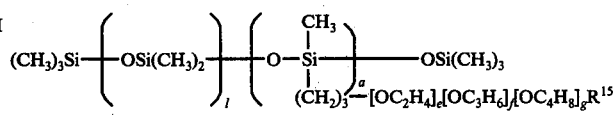

wherein the sum of $e + f + g$ is a mean value of 25 to 80, the e moiety, the f moiety and g moiety being present in the chain in any order and the ratio of the total number of oxygen atoms in the e moiety, the f mmoiety and g moiety to the number of oxygen atoms in the e moiety ranging from 2.3 to 1 to 2.8 to 1; $R^{15}$ represents $-OR^{16}$ or $$-O\overset{O}{\overset{\|}{C}}OR^{16}$$

wherein $R^{16}$ represents a saturated hydrocarbon group having less than 10 carbon atoms, a is 3 or 4 and l is a mean value of 6 to 30.

23. The process as claimed in claim 20, wherein the amount of said silicone oil is less than 2.0% by weight based on the weight of the polyetherpolyol or polyesterpolyol.

24. The process as claimed in claim 23, wherein the amount of said silicone oil ranges from about 0.3 to 1.2% by weight based on the weight of the polyetherpolyol or polyesterpolyol.

25. A flame resistant polyurethane foam produced by the process as claimed in claim 1.

* * * * *